(12) United States Patent
Dillon

(10) Patent No.: US 12,014,300 B2
(45) Date of Patent: Jun. 18, 2024

(54) APPARATUS AND METHOD FOR ESTABLISHING MAINTENANCE ROUTES WITHIN A PROCESS CONTROL SYSTEM

(71) Applicant: FISHER-ROSEMOUNT SYSTEMS, INC., Round Rock, TX (US)

(72) Inventor: Steven R. Dillon, Woodbury, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 17/136,866

(22) Filed: Dec. 29, 2020

(65) Prior Publication Data

US 2021/0120477 A1    Apr. 22, 2021

Related U.S. Application Data

(63) Continuation of application No. 13/362,476, filed on Jan. 31, 2012, now abandoned.

(51) Int. Cl.
*G06Q 10/06* (2023.01)
*G06Q 10/0631* (2023.01)
(Continued)

(52) U.S. Cl.
CPC .... *G06Q 10/063114* (2013.01); *H04W 40/12* (2013.01); *H04W 40/246* (2013.01); *H04W 40/248* (2013.01)

(58) Field of Classification Search
CPC ..... G06Q 10/06311; G06Q 10/063114; G06Q 10/06313; H04W 40/246; H04W 40/248; H04W 40/12
See application file for complete search history.

(56) References Cited

U.S. PATENT DOCUMENTS 6,711,535 B2    3/2004    Ford et al.
6,732,195 B1 *  5/2004    Baldwin ............... G06F 3/1292
                                                710/6
(Continued)

FOREIGN PATENT DOCUMENTS

CN    1640031 A    7/2005
CN    101622887 A    1/2010
(Continued)

OTHER PUBLICATIONS

International Search Report and Written Opinion in PCT/US2013/023983 dated Apr. 25, 2013.
(Continued)

*Primary Examiner* — Rutao Wu
*Assistant Examiner* — Stephen S Swartz
(74) *Attorney, Agent, or Firm* — MARSHALL, GERSTEIN & BORUN LLP

(57) ABSTRACT

Generating a maintenance route in a process control system includes creating an initial ordered list of all wireless nodes in direct communication with a wireless gateway, where the nodes are ordered by signal strength with the wireless gateway device. A subsequent ordered list is created of all nodes in direct communication with first node of the initial ordered list, where the nodes are ordered by signal strength with the first node. The subsequent ordered list is then appended to the initial ordered list after the first node. This process of creating a subsequent list and appending the initial list is iteratively repeated thereafter, each time accounting for the next node in the appended ordered list following the previous iteration until all nodes are accounted for. In the last iteration, the nodes correspond to stop points along the route and the order corresponds to the route to be taken among the stop points.

27 Claims, 12 Drawing Sheets

(51) Int. Cl.
*H04W 40/12* (2009.01)
*H04W 40/24* (2009.01)

(56) References Cited

U.S. PATENT DOCUMENTS

| | | | |
|---|---|---|---|
| 7,046,778 B2 | 5/2006 | Martin et al. | |
| 7,162,242 B2 | 1/2007 | Zhao et al. | |
| 7,295,119 B2 | 11/2007 | Rappaport et al. | |
| 7,353,018 B2 | 4/2008 | Mauney et al. | |
| 7,420,952 B2 | 9/2008 | Costa et al. | |
| 7,436,797 B2 | 10/2008 | Shepard et al. | |
| 7,447,176 B2 * | 11/2008 | Ruan | H04W 48/20 370/332 |
| 7,463,887 B2 | 12/2008 | Roberts et al. | |
| 7,522,540 B1 | 4/2009 | Maufer | |
| 7,525,420 B2 | 4/2009 | McKinney | |
| 7,702,335 B2 | 4/2010 | Zhao et al. | |
| 7,822,802 B2 | 10/2010 | Chen et al. | |
| 8,065,434 B2 * | 11/2011 | Xu | H04L 45/02 709/244 |
| 8,149,715 B1 | 4/2012 | Goel et al. | |
| 8,194,571 B2 * | 6/2012 | Herrmann | H04L 12/2803 370/254 |
| 8,208,927 B2 | 6/2012 | Zhao et al. | |
| 8,588,103 B2 | 11/2013 | Barum | |
| 8,811,349 B2 | 8/2014 | Deshpande et al. | |
| 2003/0151513 A1 | 8/2003 | Herrmann et al. | |
| 2004/0090943 A1 | 5/2004 | da Costa et al. | |
| 2005/0152283 A1 * | 7/2005 | Ritzenthaler | H04W 8/005 370/254 |
| 2006/0133328 A1 * | 6/2006 | Levendel | H04W 40/24 370/338 |
| 2006/0239276 A1 * | 10/2006 | Rodbarry | H04W 99/00 370/401 |
| 2006/0290487 A1 * | 12/2006 | McKinney | G06Q 10/06 340/506 |
| 2007/0247331 A1 * | 10/2007 | Angelis | G01D 4/006 340/870.02 |
| 2008/0146230 A1 | 6/2008 | Pandian et al. | |
| 2008/0198811 A1 * | 8/2008 | Deshpande | H04W 48/16 370/332 |
| 2009/0075690 A1 | 3/2009 | Roberts et al. | |
| 2009/0141666 A1 * | 6/2009 | Jin | H04B 7/2606 370/315 |
| 2009/0265635 A1 | 10/2009 | Citrano, III | |
| 2010/0290359 A1 | 11/2010 | Dewey et al. | |
| 2011/0158098 A1 | 6/2011 | Daraiseh et al. | |
| 2011/0164512 A1 | 7/2011 | Citrano, III et al. | |
| 2012/0035749 A1 * | 2/2012 | Schleiss | G05B 19/0428 700/79 |
| 2013/0219034 A1 | 8/2013 | Wang et al. | |

FOREIGN PATENT DOCUMENTS

| | | |
|---|---|---|
| EP | 1 480 387 | 11/2004 |
| EP | 1480387 A1 | 11/2004 |

OTHER PUBLICATIONS

International Preliminary Report on Patentability for Application No. PCT/US2013/023983, dated Aug. 5, 2014.
Communication in EP Application No. 13 704 322.0 dated Sep. 14, 2015.
Office Action in CN Application No. 201310036313.8 dated Aug. 3, 2016, 9 pages.
Office Action in RU Application No. 2014132567 dated Feb. 1, 2017, 16 pages.
Office Action in IN Application No. 6372/CHENP/2014 dated Sep. 25, 2019, 6 pages.

* cited by examiner

Mesh Network Topology

GTWY: N03, N01, N02
N01: N04, N02, N06, GTWY, N05
N02: N08, N01, N10, N07, N03, GTWY
N03: GTWY, N11, N10, N02
N04: N05, N01, N06
N05: N06, N04, N01
N06: N05, N04, N01
N07: N08, N02, N09
N08: N02, N07, N10, N09
N09: N07, N12, N08
N10: N11, N08, N03, N02, N12
N11: N10, N03
N12: N09, N10

*FIG. 4A*

P-to-P Network Topology

GTWY: N03, N01, N02
N01: N04, N06, GTWY, N05
N02: N08, N07, GTWY
N03: GTWY, N11, N10
N04: N01
N05: N01
N06: N01
N07: N02
N08: N02, N09
N09: N08
N10: N03, N12
N11: N03
N12: N10

*FIG. 4B*

APPARATUS AND METHOD FOR ESTABLISHING MAINTENANCE ROUTES WITHIN A PROCESS CONTROL SYSTEM

CROSS-REFERENCE TO RELATED APPLICATIONS

The present application is a continuation of pending U.S. patent application Ser. No. 13/362,476, filed Jan. 31, 2012, and entitled "APPARATUS AND METHOD FOR ESTABLISHING MAINTENANCE ROUTES WITHIN A PROCESS CONTROL SYSTEM," the entirety of which is incorporated by reference herein in its entirety.

FIELD OF THE TECHNOLOGY

The present disclosure relates generally to process control systems within process plants and, more particularly, to dynamically generating and updating maintenance routes in a process control system having a wireless network based on network topology.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

The manner in which process control systems are implemented has evolved over the years. Older generations of process control systems were typically implemented using dedicated, centralized hardware and hard-wired connections.

However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more process controllers via one or more digital data buses. In addition to smart field devices, modern process control systems may also include analog field devices such as, for example, 4-20 milliamp (mA) devices, 0-10 volts direct current (VDC) devices, etc., which are typically directly coupled to controllers as opposed to a shared digital data bus or the like.

In a typical industrial or process plant, a distributed control system (DCS) is used to control many of the industrial processes performed at the plant. The plant may have a centralized control room having a computer system with user input/output (I/O), a disc I/O, and other peripherals known in the computing art with one or more process controllers and process I/O subsystems communicatively connected to the centralized control room. Additionally, one or more field devices are typically connected to the I/O subsystems and to the process controllers to implement control and measurement activities within the plant. While the process I/O subsystem may include a plurality of I/O ports connected to the various field devices throughout the plant, the field devices may include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, indicator lights or any other device typically used in process plants.

As used herein, the term "field device" encompasses these devices, as well as any other device that performs a function in a control system. In any event, field devices may include, for example, input devices (e.g., devices such as sensors that provide status signals that are indicative of process control parameters such as, for example, temperature, pressure, flow rate, etc.), as well as control operators or actuators that perform actions in response to commands received from controllers and/or other field devices.

Traditionally, analog field devices have been connected to the controller by two-wire twisted pair current loops, with each device connected to the controller by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 mA running through the loop. An analog field device that transmits a signal to the control room modulates the current running through the current loop, with the current being proportional to the sensed process variable.

An analog field device that performs an action under control of the control room is controlled by the magnitude of the current through the loop, which current is modulated by the I/O port of the process I/O system, which in turn is controlled by the controller. Traditional two-wire analog devices having active electronics can also receive up to 40 milliwatts of power from the loop. Analog field devices requiring more power are typically connected to the controller using four wires, with two of the wires delivering power to the device. Such devices are known in the art as four-wire devices and are not power limited, as typically are two-wire devices.

A discrete field device can transmit or respond to a binary signal. Typically, discrete field devices operate with a 24 volt signal (either AC or DC), a 110 or 240 volt AC signal, or a 5 volt DC signal. Of course, a discrete device may be designed to operate in accordance with any electrical specification required by a particular control environment. A discrete input field device is simply a switch which either makes or breaks the connection to the controller, while a discrete output field device will take an action based on the presence or absence of a signal from the controller.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve somewhere between a fully open and a fully closed position based on the magnitude of the current flowing through the two-wire twisted pair.

More recently, field devices that are part of hybrid systems become available that superimpose digital data on the current loop used to transmit analog signals. One such hybrid system is known in the control art as the Highway Addressable Remote Transducer (HART) protocol. The HART system uses the magnitude of the current in the current loop to send an analog control signal or to receive a sensed process variable (as in the traditional system), but also superimposes a digital carrier signal upon the current loop signal. The HART protocol makes use of the Bell 202 Frequency Shift Keying (FSK) standard to superimpose the digital signals at a low level on top of the 4-20 mA analog signals. This enables two-way field communication to take place and makes it possible for additional information beyond just the normal process variable to be communicated to/from a smart field instrument. The HART protocol communicates at 1200 bps without interrupting the 4-20 mA signal and allows a host application (master) to get two or more digital updates per second from a field device. As the digital FSK signal is phase continuous, there is no interference with the 4-20 mA signal.

The FSK signal is relatively slow and can therefore provide updates of a secondary process variable or other parameter at a rate of approximately 2-3 updates per second. Generally, the digital carrier signal is used to send secondary and diagnostic information and is not used to realize the primary control function of the field device. Examples of information provided over the digital carrier signal include secondary process variables, diagnostic information (including sensor diagnostics, device diagnostics, wiring diagnostics, and process diagnostics), operating temperatures, a sensor temperature, calibration information, device ID numbers, materials of construction, configuration or programming information, etc. Accordingly, a single hybrid field device may have a variety of input and output variables and may implement a variety of functions.

More recently, a newer control protocol has been defined by the Instrument Society of America (ISA). The new protocol is generally referred to as Fieldbus, and is specifically referred to as SP50, which is as acronym for Standards and Practice Subcommittee 50. The Fieldbus protocol defines two subprotocols. An H1 Fieldbus network transmits data at a rate up to 31.25 kilobits per second and provides power to field devices coupled to the network. An H2 Fieldbus network transmits data at a rate up to 2.5 megabits per second, does not provide power to field devices connected to the network, and is provided with redundant transmission media. Fieldbus is a nonproprietary open standard and is now prevalent in the industry and, as such, many types of Fieldbus devices have been developed and are in use in process plants. Because Fieldbus devices are used in addition to other types of field devices, such as HART and 4-20 mA devices, with a separate support and I/O communication structure associated with each of these different types of devices.

Newer smart field devices, which are typically all digital in nature, have maintenance modes and enhanced functions that are not accessible from or compatible with older control systems. Even when all components of a distributed control system adhere to the same standard (such as the Fieldbus standard), one manufacturer's control equipment may not be able to access the secondary functions or secondary information provided by another manufacturer's field devices.

Thus, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the I/O communications network is subjected to environmental factors or conditions associated with the process control system. For example, many industrial control applications subject field devices and their associated I/O communication networks to harsh physical environments (e.g., high, low or highly variable ambient temperatures, vibrations, corrosive gases or liquids, etc.), difficult electrical environments (e.g., high noise environments, poor power quality, transient voltages, etc.), etc. In any case, environmental factors can compromise the integrity of communications between one or more field devices, controllers, etc. In some cases, such compromised communications could prevent the process control system from carrying out its control routines in an effective or proper manner, which could result in reduced process control system efficiency and/or profitability, excessive wear or damage to equipment, dangerous conditions that could damage or destroy equipment, building structures, the environment and/or people, etc.

In order to minimize the effect of environmental factors and to assure a consistent communication path, I/O communication networks used in process control systems have historically been hardwired networks, with the wires being encased in environmentally protected materials such as insulation, shielding and conduit. Also, the field devices within these process control systems have typically been communicatively coupled to controllers, workstations, and other process control system components using a hardwired hierarchical topology in which non-smart field devices are directly coupled to controllers using analog interfaces such as, for example, 4-20 mA, 0-10 VDC, etc. hardwired interfaces or I/O boards. Smart field devices, such as Fieldbus devices, are also coupled via hardwired digital data busses, which are coupled to controllers via smart field device interfaces.

While hardwired I/O communication networks can initially provide a robust I/O communication network, their robustness can be seriously degraded over time as a result of environmental stresses (e.g., corrosive gases or liquids, vibration, humidity, etc.). For example, contact resistances associated with the I/O communication network wiring may increase substantially due to corrosion, oxidation and the like. In addition, wiring insulation and/or shielding may degrade or fail, thereby creating a condition under which environmental electrical interference or noise can more easily corrupt the signals transmitted via the I/O communication network wires. In some cases, failed insulation may result in a short circuit condition that results in a complete failure of the associated I/O communication wires.

Additionally, hardwired I/O communication networks are typically expensive to install, particularly in cases where the I/O communication network is associated with a large industrial plant or facility that is distributed over a relatively large geographic area, for example, an oil refinery or chemical plant that consumes several acres of land. In many instances, the wiring associated with the I/O communication network must span long distances and/or go through, under or around many structures (e.g., walls, buildings, equipment, etc.) Such long wiring runs typically involve substantial amounts of labor, material and expense. Further, such long wiring runs are especially susceptible to signal degradation due to wiring impedances and coupled electrical interference, both of which can result in unreliable communications.

Moreover, such hardwired I/O communication networks are generally difficult to reconfigure when modifications or updates are needed. Adding a new field device typically requires the installation of wires between the new field device and a controller. Retrofitting a process plant in this manner may be very difficult and expensive due to the long wiring runs and space constraints that are often found in older process control plants and/or systems. High wire counts within conduits, equipment and/or structures interposing along available wiring paths, etc., may significantly increase the difficulty associated with retrofitting or adding field devices to an existing system. Exchanging an existing field device with a new device having different field wiring requirements may present the same difficulties in the case where more and/or different wires have to be installed to accommodate the new device. Such modifications may often result in significant plant downtime.

Wireless I/O communication networks have been used to alleviate some of the difficulties associated with hardwired I/O networks, and to alleviate the costs involved in deploying sensors and actuators within the process control system. Wireless I/O communication networks have also been suggested for process control systems and portions thereof that are relatively inaccessible or inhospitable for hardwired I/O communication networks. For example, Shepard et al., U.S. Pat. No. 7,436,797 entitled "Wireless Architecture And Support For Process Control Systems" and patented Oct. 14, 2008, the content of which is expressly incorporated by reference herein, discloses that relatively inexpensive wireless mesh networks may be deployed within a process control system, either alone or in combination with point-to-point communications, to produce a robust wireless communication network that can be easily set up, configured, changed and monitored, to thereby make the wireless communication network more robust, less expensive and more reliable.

Wireless mesh networks (or mesh networking topology) utilize multiple nodes, each of which may serve not only as a client to receive and send its own data, but also as a repeater or relay to propagate data through the network to other nodes. Each node is connected to another neighboring node, and preferably to multiple neighboring nodes, each of which may be connected to additional neighboring nodes. The result is a network of nodes that provides multiple paths of communication from one node to another through the network, thereby creating a relatively inexpensive, robust network that allows for continuous connections and reconfigurations even when communication paths are broken or blocked.

In a wireless mesh network, each device (node) may connect to a gateway via direct wireless connection or indirectly via a connection through a neighboring device. Each device has a signal strength that generally correlates to the physical proximity of the device to the wireless gateway or to a neighboring device. In cases where no direct connection to the wireless gateway is available, each device connects to the gateway through another peer device that has a connection to the gateway or to another device. The number of devices used to chain together a connection of a device to the gateway is known as the number of hops in a connection path. Each device uses the connection path, and the order in which the device-to-device connections are established is known as the communication route.

Regardless of the type of network implemented within a process system, maintenance personnel are tasked with maintaining and calibrating the devices within the network. This means physically walking through the process plant from device to device according to an ordered list of stop points to perform necessary data gathering, maintenance and calibration activities. Traditionally, route-based maintenance software applications have utilized a process for establishing maintenance routes using knowledge of the physical location of the devices and the specification of where the stop points are along a defined route. The route contained an ordered list of stop points that an engineer or other maintenance personnel walked through to perform tasks related to gathering data, calibrating devices, performing maintenance on the device or performing a visual inspection of the device. While the defined route was intended to provide the most efficient path to perform these tasks, it nonetheless relied upon a manual process for deciding which tasks occur along a given path in the route. That is, while route-based maintenance software applications generated work orders for the maintenance personnel, the routes used by the maintenance personnel were generated manually, often relying on the knowledge of the physical location of the devices and the stop points. Not only was this an inefficient use of the maintenance personnel's time, particularly where the devices and stop points may number in the dozens or hundreds, but the manually-created routes were not necessarily the most optimal or efficient, and were sometimes vastly sub-optimal.

SUMMARY

Signal strength and communication paths within a wireless network are utilized to automatically establish a maintenance route for maintenance or other plant personnel to perform device calibration, data gathering, equipment inspection or other maintenance activities as defined in the maintenance route. The process by which the maintenance route is established is based on a sequence of calculations taking into account the proximity of each device with the wireless gateway and/or with respect to neighboring devices. The proximity is inferred from the signal strength with the wireless gateway and/or with neighboring devices, and the number of hops that occur in the communication path for a given set of devices communicating in the network. Taking into account all devices communicating with the wireless gateway either directly or via another device, a ordered list of all devices with zero hops in their communication path (i.e., directly communicating with the gateway) is created, where the devices are ordered by signal strength with the wireless gateway. Beginning with the first device in the list, a further ordered list is created of neighboring devices in direct communication with the first device, and the further ordered list is appended to the initial ordered list after the first device. This process of creating a further ordered list and appending the initial ordered list is iteratively repeated thereafter, each time accounting for the next device in the appended ordered list following the previous iteration until all devices are accounted for. Once all devices communicating with the wireless gateway, either directly or via another device, are accounted for, the devices in the list correspond to stop points along the route and the order of the devices in the list corresponds to the route to be taken among the stop points.

BRIEF DESCRIPTION OF THE DRAWINGS

FIGS. 4A and 4B are charts presented in tabular form illustrating wireless mesh network and wireless point-to-point topographies of nodes and corresponding neighboring nodes in order of proximity;

DETAILED DESCRIPTION

Figure 1:
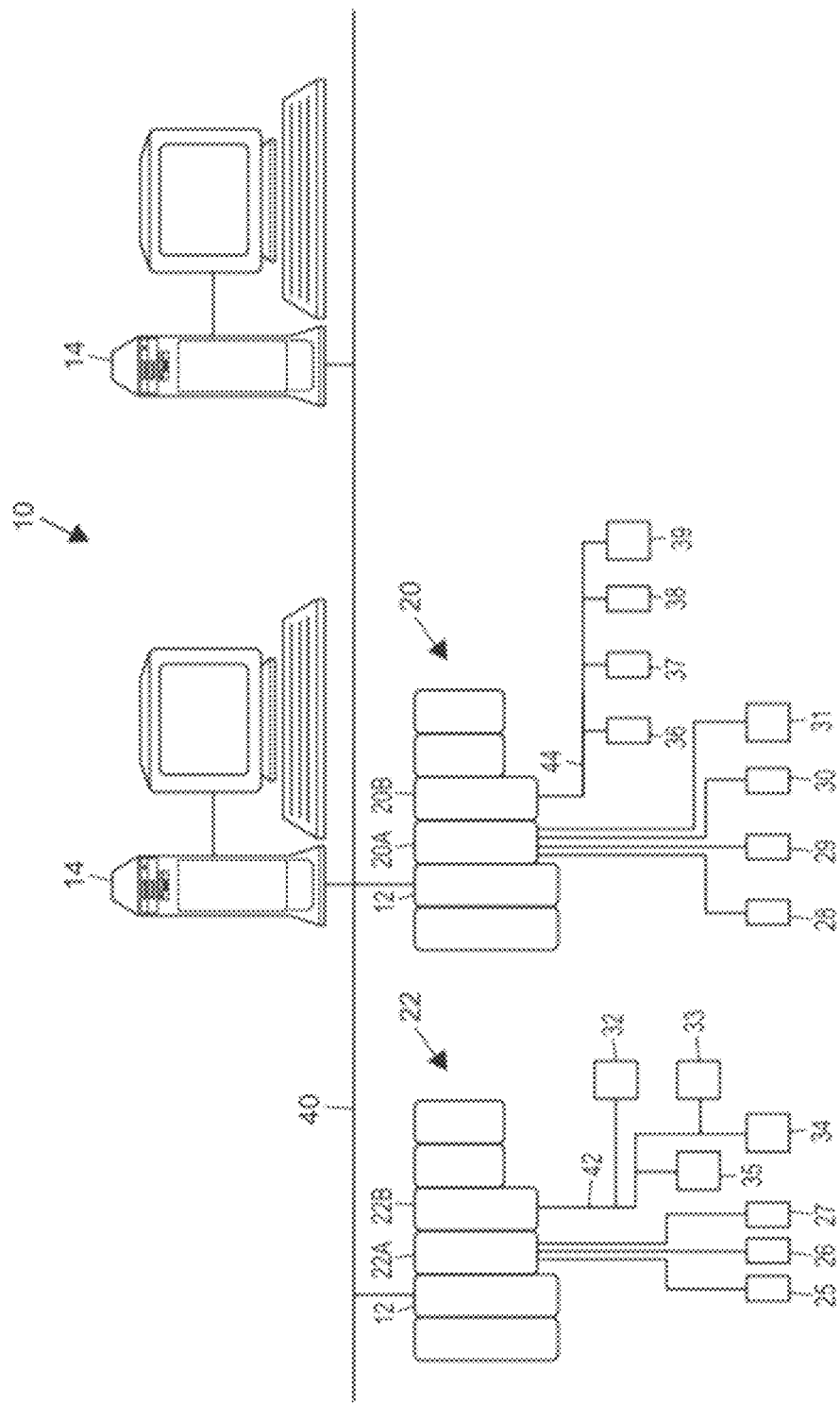
FIG. 1 is a combined block and schematic diagram of a distributed control system in accordance with this disclosure.

Referring now to FIG. 1, a hardwired distributed process control system 10 includes one or more process controllers 12 connected to one or more host workstations or computers 14 (which may be any type of personal computer or workstation). The process controllers 12 are also connected to banks of input/output (I/O) devices 20, 22 each of which, in turn, is connected to one or more field devices 25-39. The controllers 12, which may be, by way of example only, DeltaV™ controllers sold by Fisher-Rosemount Systems, Inc., are communicatively connected to the host computers 14 via, for example, an Ethernet connection 40 or other communication link. Likewise, the controllers 12 are communicatively connected to the field devices 25-39 using any desired hardware and software associated with, for example, standard 4-20 ma devices and/or any smart communication protocol such as the Fieldbus or HART protocols. As is generally known, the controllers 12 implement or oversee process control routines stored therein or otherwise associated therewith and communicate with the devices 25-39 to control a process in any desired manner.

The field devices 25-39 may be any types of devices, such as sensors, valves, transmitters, positioners, etc. while the I/O cards within the banks 20 and 22 may be any types of I/O devices conforming to any desired communication or controller protocol such as HART, Fieldbus, Profibus, etc. In the embodiment illustrated in FIG. 1, the field devices 25-27 are standard 4-20 mA devices that communicate over analog lines to the I/O card 22A. The field devices 28-31 are illustrated as HART devices connected to a HART compatible I/O device 20A. Similarly, the field devices 32-39 are smart devices, such as Fieldbus field devices, that communicate over a digital bus 42 or 44 to the I/O cards 20B or 22B using, for example, Fieldbus protocol communications. Of course, the field devices 25-39 and the banks of I/O cards 20 and 22 could conform to any other desired standard(s) or protocols besides the 4-20 mA, HART or Fieldbus protocols, including any standards or protocols developed in the future.

Each of the controllers 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course hybrid and other types of function blocks exist. Groups of these function blocks are called modules. Function blocks and modules may be stored in and executed by the controller 12, which is typically the case when these function blocks are used for, or are associated with standard 4-20 mA devices and some types of smart field devices, or may be stored in and implemented by the field devices themselves, which may be the case with Fieldbus devices. While the control system 10 illustrated in FIG. 1 is described as using function block control-strategy, the control strategy could also be implemented, or designed using other conventions, such as ladder logic, sequential flow charts, etc. and using any desired proprietary or non-proprietary programming language.

Still further, in a known manner, one or more of the workstations 14 may include user interface applications to enable a user, such as an operator, a configuration engineer, a maintenance person, etc. to interface with the process control network 10 within the plant. In particular, the workstation 14 may include one or more user interface applications which may be executed on a processor within the workstation 14 to communicate with a database, the control modules or other routines within the controllers 12 or I/O banks 20, 22, with the field devices 25-39 and the modules within these field devices, etc. to obtain information from the plant, such as information related to the ongoing state of the process control system 10. The user interface applications may process and/or display this collected information on a display device associated with one or more of the workstations 14. The collected, processed and/or displayed information may be, for example, process state information, alarms and alerts generated within plant, maintenance data, etc. Likewise, one or more applications may be stored in an executed in the workstations 14 to perform configuration activities such as creating or configuring the modules to be executed within the plant, to perform control operator activities, such as changing setpoints or other control variables, within the plant, etc. Of course the number and type of routines is not limited by the description provided herein and other numbers and types of process control related routines may be stored in an implemented within the workstations 14 if desired. The workstations 14 may also be connected via, for example, the internet, extranet, bus, Ethernet 40, etc., to a corporate WAN as well as to a computer system that enables remote monitoring of or communication with the plant 10 from remote locations.

As evident from the discussion of FIG. 1, the communications between the host workstations 14 and the controllers 12 and between the controllers 12 and the field devices 25-39 are implemented with hardwired communication connections, including one or more of HART, Fieldbus and 4-20 mA hardwired communication connections. However, as noted above, the hardwired communication connections may be replaced or augmented within the process environment of FIG. 1 with wireless communications in an manner that is reliable, that is easy to set up and configure, that provides an operator or other user with the ability to analyze or view the functioning capabilities of the wireless network, etc.

For example, wireless networks may be deployed throughout the process control system as disclosed in U.S. Pat. No. 7,436,797 incorporated by reference above. As a result, some or all of the I/O devices within a process control system, such as sensors and actuators, may be deployed and communicatively coupled to the process control system using hardwired technologies, wireless technologies or combination thereof. For example, hardwired communications may be maintained between and among some of the controllers 12, the workstations 14, and the field devices 25-31, whereas wireless communications may be established between and among others of the controllers 12, the workstations 14, and field devices 32-39. Wireless technologies may include, but are not limited to, ZigBee, WiFi, Bluetooth, Ultra Wideband (UWB), etc., or any other short-range wireless technology, as well as satellite, Wi-Max, and other long-range wireless transmission. In particular, wireless technologies may include any commercial off-the-shelf wireless products to transmit process control data. A network protocol may be implemented on top of the wireless technology, or a new process control standard may be developed for wireless communication. In one example, mesh technologies, such as a self-healing/self-organizing ad hoc wireless mesh technology, may be implemented.

Figure 2:
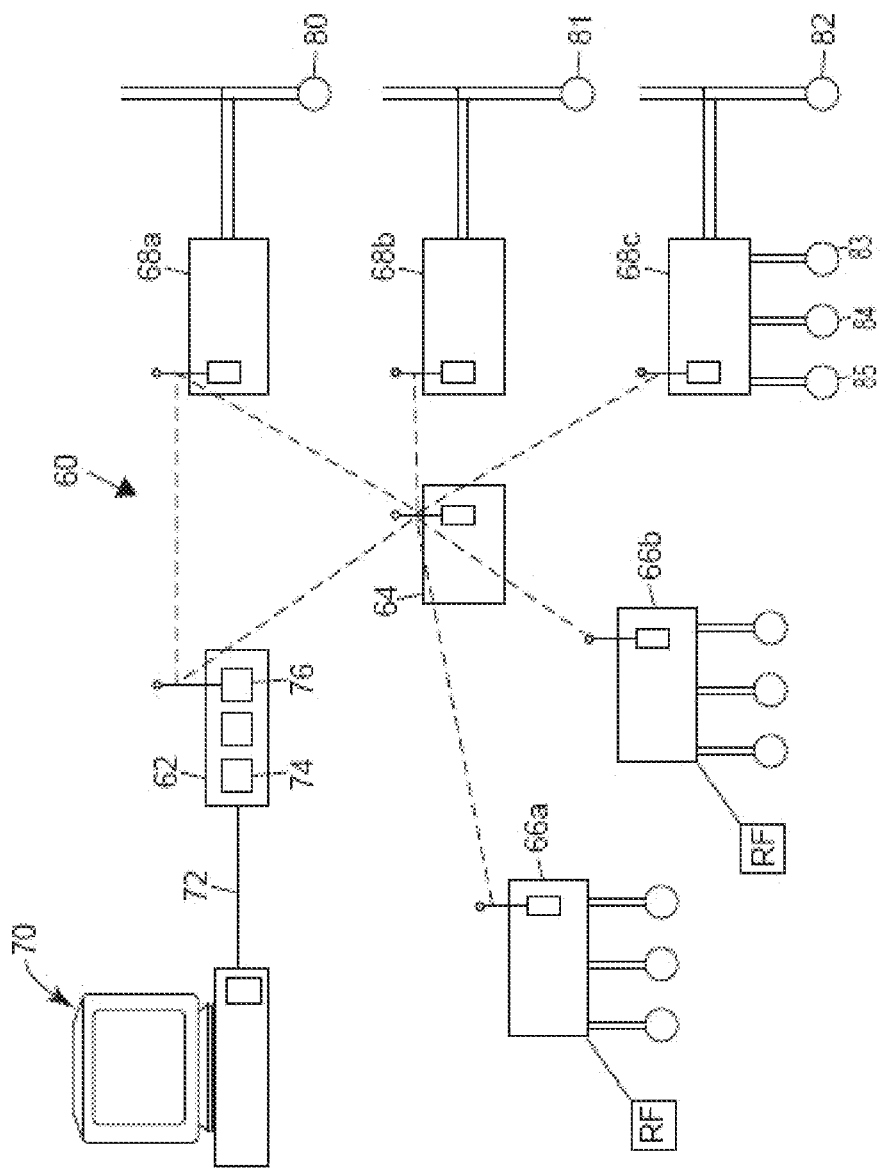
FIG. 2 is a combined block and schematic diagram of a wireless communication network within a portion of a process environment in accordance with this disclosure.

FIG. 2 illustrates a wireless communication network 60 that may be used to provide communications between the different devices illustrated in FIG. 1 and, in particular, between the controllers 12 (or the associated I/O devices 22) of FIG. 1 and the field devices 25-39, between the controllers 12 and the host workstations 14 or between the host workstations 14 and the field devices 25-39 of FIG. 1. However, it will be understood that the wireless communication network 60 of FIG. 2 could be used to provide communications between any other types or sets of devices within a process plant or a process environment.

The communication network 60 of FIG. 2 is illustrated as including various communication nodes including one or more base nodes 62, one or more repeater nodes 64, one or more environment nodes 66 (illustrated in FIG. 2 as nodes 66a and 66b) and one or more field nodes 68 (illustrated in FIG. 2 as nodes 68a, 68b and 68c). Generally speaking, the nodes of the wireless communication network 60 operate as a mesh type communication network, wherein each node receives a communication, determines if the communication is ultimately destined for that node and, if not, repeats or passes the communication along to any other nodes within communication range. As is known, any node in a mesh network may communicate with any other node in range to forward communications within the network, and a particular communication signal may go through multiple nodes before arriving at the desired destination. A further conceptual example of a mesh network topology is discussed below with respect to FIGS. 3 and 4.

As illustrated in FIG. 2, the base node 62 includes or is communicatively coupled to a work station or a host computer 70 which may be for example any of the hosts or workstations 14 of FIG. 1. While the base node 62 is illustrated as being linked to the workstation 70 via a hardwired Ethernet connection 72, any other communication link may be used instead. The base node 62 includes a wireless conversion or communication unit 74 and a wireless transceiver 76 to effect wireless communications over the network 60. In particular, the wireless conversion unit 74 takes signals from the workstation or host 70 and encodes these signals into a wireless communication signal which is then sent over the network 60 via the transmitter portion of the transceiver 76. Conversely, the wireless conversion unit 74 decodes signals received via the receiver portion of the transceiver 76 to determine if that signal is destined for the base node 62 and, if so, further decodes the signal to strip off the wireless encoding to produce the original signal generated by the sender at a different node 64, 66 or 68 within the network 60.

As will be understood, in a similar manner, each of the other communication nodes including the repeater nodes 64, the environmental nodes 66 and the field nodes 68 includes a communication unit and a wireless transceiver (not shown) for encoding, sending and decoding signals sent via the wireless mesh network 60. While the different types of nodes 64, 66, 68 within the communication network 60 differ in some important ways, each of these nodes generally operates to receive wireless signals, decode the signal enough to determine if the signal is destined for that node (or a device connected to that node outside of the wireless communication network 60), and repeat or retransmit the signal if the signal is not destined for that node and has not previously been transmitted by that node. In this manner, signals are sent from an originating node to all the nodes within wireless communication range, each of the nodes in range which are not the destination node then retransmits the signal to all of the other nodes within range of that node, and the process continues until the signal has propagated to all of the nodes within range of at least one other node. However, the repeater node 64 operates to simply repeat signals within the communication network 60 to thereby relay a signal from one node through the repeater node 64 to a second node 62, 66 or 68. Basically, the function of the repeater node 64 is to act as a link between two different nodes to assure that a signal is able to propagate between the two different nodes when these nodes are not or may not be within direct wireless communication range of one another. Because the repeater node 64 is not generally tied to other devices at the node, the repeater node 64 only needs to decode a received signal enough to determine if the signal is a signal that has been previously repeated by the repeater node (that is, a signal that was sent by the repeater node at a previous time and which is simply being received back at the repeater node because of the repeating function of a different node in the communication network 60). If the repeater node has not received a particular signal before, the repeater node 64 simply operates to repeat this signal by retransmitting that signal via the transceiver of the repeater node 64. It should be noted, however, that repeater nodes 64 may not be necessary within a wireless mesh network, provided there is a sufficient number of other nodes 66, 68 in communication with one another to avoid isolated nodes and/or pinch points. That is, when a node must rely upon a single node or a limited number of nodes to route messages to the base node 62, a pinch point (also known as a communication bottleneck) may occur within the network. Repeater nodes 64 may be used to alleviate pinch points or the risk of pinch points (i.e., the risk of a pinch point occurring if a node 66, 68 fails).

On the other hand, each of the field nodes 68 is generally coupled to one or more devices within the process plant environment and, generally speaking, is coupled to one or more devices, illustrated as field devices 80-85 in FIG. 2. The field devices 80-85 may be any type of field devices including, for example, four-wire devices, two-wire device, HART devices, Fieldbus devices, 4-20 mA devices, smart or non-smart devices, etc., such as the devices 25-39 of FIG. 1. For the sake of illustration, the field devices 80-85 of FIG. 2 are illustrated as HART field devices, conforming to the HART communication protocol. Of course, the devices 80-85 may be any type of device, such as a sensor/transmitter device, a valve, a switch, etc, such as field devices. Additionally, the devices 80-85 may be other than traditional field devices such as controllers 12, I/O devices 22A-20B, work stations 14, or any other types of devices. It should also be understood that a field node 68 (as well as the nodes 66) may be integrated with the device to which it corresponds, thereby creating a wireless device, such as wireless controllers, wireless I/O devices, wireless workstations, wireless field devices, etc.

In any event, the field node 68a, 68b, 68c includes signal lines attached to their respective field devices 80-85 to receive communications from and to send communications to the field devices 80-85. Of course, these signal lines may be connected directly to the devices 80-85, in this example, a HART device, or to the standard HART communication lines already attached to the field devices 80-85. If desired, the field devices 80-85 may be connected to other devices, such as I/O devices 20A or 22A of FIG. 1, or to any other desired devices via hardwired communication lines in addition to being connected to the field nodes 68a, 68b, 68c. Additionally, as illustrated in FIG. 2, any particular field node 68a, 68b, 68c may be connected to a plurality of field devices (as illustrated with respect to the field node 68c, which is connected to four different field devices 82-85) and each field node 68a, 68b, 68c operates to relay signals to and from the field devices 80-85 to which it is connected.

In order to assist in the management in the operation of the communication network 60, the environmental nodes 66 are used. In this case, the environmental nodes 66a and 66b includes or is communicatively connected to devices or sensors that measure environmental parameters, such as the humidity, temperature, barometric pressure, rainfall, or any other environmental parameters which may affect the wireless communications occurring within the communication network 60. This information may be useful in analyzing and predicting problems within the communication network, as many disruptions in wireless communications are at least partially attributable to environmental conditions. If desired, the environmental sensors may be any kind of sensor and may include, for example, HART sensors/transmitters, 4-20 mA sensors or on board sensors of any design or configuration. Of course, each environmental node 66a, 66b may include one or more environmental sensors and different environmental nodes may include the same or different types or kinds of environmental sensors if so desired. Likewise, if desired, one or more of the nodes 66a, 66b may include an electromagnetic ambient noise measurement device to measure the ambient electromagnetic noise level, especially at the wavelengths used by the communication network 60 to transmit signals. Of course, if a spectrum other an RF spectrum is used by the communication network 60, a different type of noise measurement device may be included in one or more of the environmental nodes 66. Still further, while the environmental nodes 66 of FIG. 2 are described as including environmental measurement devices or sensors, any of the other nodes 68 could include those measurement devices so that an analysis tool may be able to determine the environmental conditions at each node when analyzing the operation of the communication network 60.

It will be noted that FIG. 2 is a schematic diagram and the placement of the environmental nodes 66a, 66b relative to the field nodes 68a-68c are not intended to be relative to their actual placement in an actual process control area. Rather, the environmental nodes 66a, 66b (and other environmental nodes not pictured or a single environmental node) are intended to be placed about the process control area in a logical and strategic manner as shown conceptually in FIGS. 3 and 4.

Figure 3:
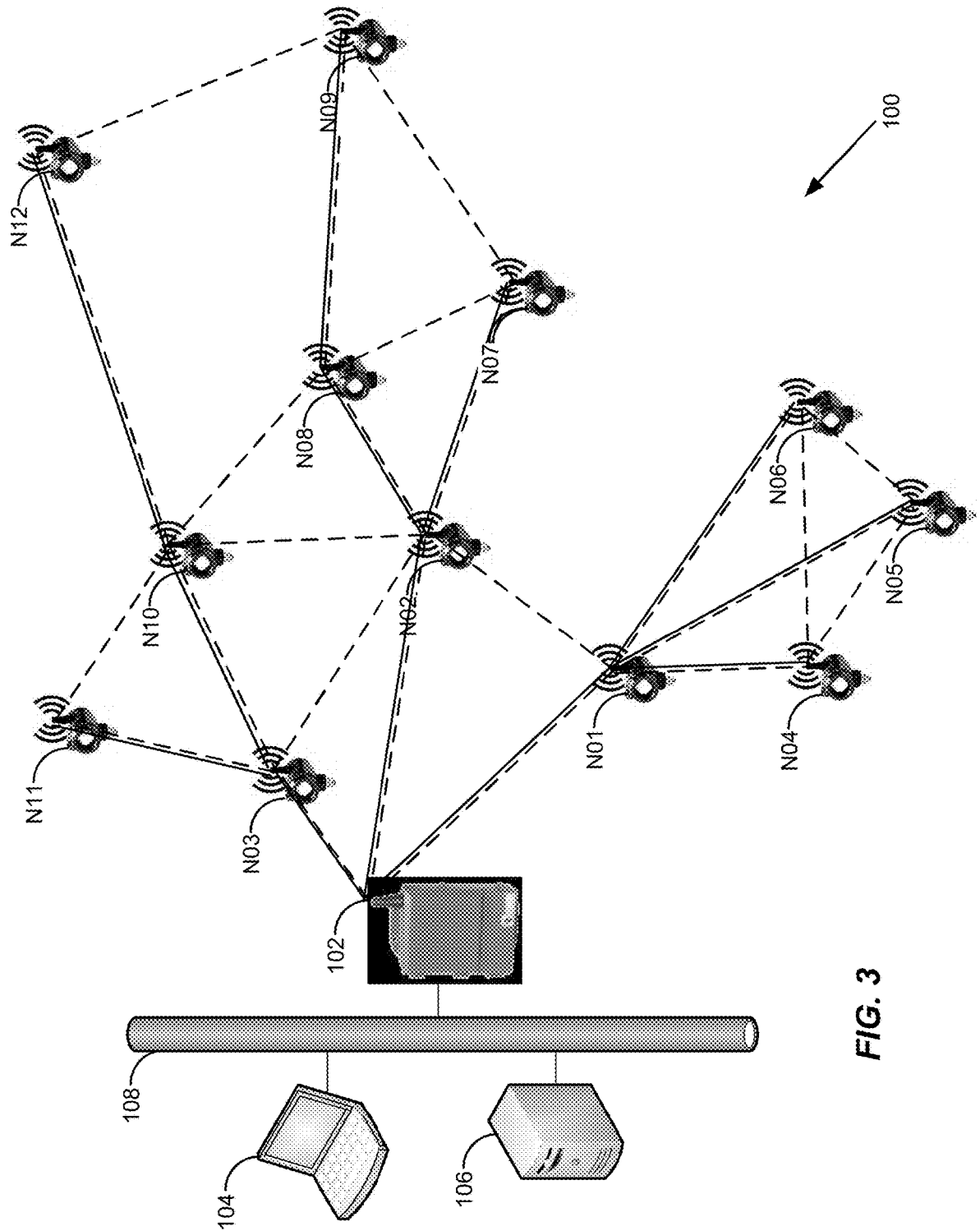
FIG. 3 is a schematic diagram of a wireless communication environment in which a wireless network includes a plurality of nodes corresponding to various field devices.

FIG. 3 conceptually illustrates a network 100 with a wireless gateway 102 in communication with nodes N01-N12 which correspond to various field devices, such as field devices 25-39, and controllers, such as controllers 12, where the gateway 102 and nodes N01-N12 make up a wireless mesh network. The field devices and controllers to which the nodes correspond are generally considered smart-measurement, wireless-enabled process devices. Because the field devices and controllers are wireless-enabled process devices, they communicate within the network 100 and with the workstation 104 and server 106 via the gateway 102. Thus, as with traditional hardwired network, the wireless-enabled process devices are able to exchange process data with the workstation 104 and server 106, and in a wireless mesh or point-to-point configuration, each wireless-enabled field device and controller serves not only as a client to receive and send its own data, but also as a repeater or relay to propagate data through the network to other process devices. Thus, each wireless-enabled field device and controller is a node within the network 100. The term "node" as used herein refers to a logical representation of a physical wireless-enabled process device within the network 100. Accordingly, it should be understood that while the term "node" is used to describe the maintenance route generation techniques, the term is also representative of the wireless process devices that physically make up the network 100. Thus, the maintenance route generation techniques, although described herein with reference to nodes, may be performed using identification of process devices, such as device tags or other identification that uniquely identifies each process device within the network 100.

The wireless gateway 102 and nodes N01-N12 communicate using a wireless communication protocol, such as WirelessHART protocol (IEC 62591), although other wireless protocols may also be used. WirelessHART protocol is a time division multiple access (TDMA) channel access and channel hopping for communication within wireless network 100. Network manager software may be implemented on the wireless gateway 102 in order to schedule communications among nodes N01-N12 and the wireless gateway 102, and define communication paths within the wireless mesh network 100. Although FIG. 3 shows wireless mesh network 100 with only a single gateway 102, more than one gateway may be provided, in which case the gateways may share network manager software. Likewise, although only 12 nodes are shown, a mesh network can easily have dozens or hundreds of nodes making up the network, which makes the maintenance route generation routine all the most useful.

The mesh network 100 is, in turn, connected to host workstations or computers 104, such as the host workstations or computers 14, and/or servers 106 via a communication link 108, illustrated as an Ethernet connection, such as the Ethernet connection 40. The gateway 102 may correspond to the base node 62 above, and interfaces the mesh network with the host workstations 14 and/or servers 106 via the Ethernet connection 108 using a number of different protocols, such as those mentioned above. As such, while the wireless gateway 102 is illustrated as being linked to the workstation 104 via the hardwired Ethernet connection 108, any other communication link may be used instead, such as a wireless communication link, examples of which were provided above.

Where the wireless mesh connections are shown in broken line, optionally some or all of the nodes N01-N12 may be connected in a wireless point-to-point configuration, as shown by the solid lines in FIG. 3. Thus, it should be understood that the network 100 may have alternative configurations, such that the network 100 may be solely a wireless point-to-point network, solely a wireless mesh network, switchable from a wireless point-to-point network to a wireless mesh network and vice versa, or a combination of wireless point-to-point and wireless mesh networks. Examples of switchable wireless networks (e.g., mesh to point-to-point and vice versa) and combination of wireless point-to-point and wireless mesh networks disclosed in Shepard et al., U.S. Pat. No. 7,436,797 referenced above. It should further be understood that the network 100 may be implemented in combination with a hardwired network, such as that disclosed in Chen et al., U.S. Pat. No. 7,822,802 entitled "Apparatus and Method for Merging Wireless Data Into An Established Process Control System" and patented Oct. 26, 2010, the content of which is expressly incorporated by reference herein.

Although not necessarily representative of the placement of the nodes N01-N12 relative to their actual placement in an actual process control area, FIG. 3 does conceptually represent the placement of the nodes N01-N12 relative to one another and relative to the wireless gateway 102. For example, in a wireless mesh network relative to the wireless gateway 102, node N03 is closest, node N01 is the next closest and the node N02 is the furthest from the wireless gateway 102. Relative to node N01, node 04 is the closest, node N02 is the next closest, node N06 is the next closest thereafter and node 05 is the furthest from the node N01, and so on and so forth with every node in the network 100. Note, only those nodes that are in direct communication are considered as being relative to one another. For example, in a point-to-point wireless network the placement of the network nodes N01, N02 and N03 would be considered relative to the wireless gateway 102, but not relative to each other because node N01-N03 do not communicate directly with one another. Likewise, in a hardwired network the placement of the network nodes N01, N02 and N03 would be considered relative to the Ethernet 104, but not relative to each other.

The zero hop counts for the wireless mesh network shown in FIG. 3 are shown in tabular form in FIG. 4A, and the zero hop counts for the wireless point-to-point network are shown in tabular form in FIG. 4B. The listing of nodes (and the gateway, where applicable) in the rows is arranged according to the physical distance of the node from the node (or gateway) listed in the first column. However, it is not necessarily indicative of the route of messages through the network, particularly with respect to a mesh network where a data packet may take any of a number of routes to its destination.

Referring to FIG. 4A, the wireless gateway 102 communicates directly with nodes N01 through N03 and therefore the hop count between the wireless gateway 102 and any one of N01 through N03 is zero. Turning to the second row of the table of FIG. 4A, it will be noted that the hop count between node N01 and nodes N02 and N04-N06 is also zero as node N01 is illustrated in FIG. 3 as having direct communication with the gateway 102 and each of nodes N02 and N04-N06. Likewise, each of the remaining rows of the table in FIG. 4A demonstrate the zero hop counts for each of the nodes N02-N12.

Referring to FIG. 4B, the wireless gateway 102 communicates directly with nodes N01 through N03, such that the hop count between the wireless gateway 102 and any one of N01 through N03 is again zero. In the second row of the table of FIG. 4B, however, the hop count between node N01 and the other nodes is zero with respect to only N04-N06 and the gateway 102 as node N01 is illustrated in FIG. 3 as only having direct communication with the gateway 102 and each of nodes N04-N06, but not node N02 in this instance. Again, each of the remaining rows of the table in FIG. 4B demonstrate the zero hop counts for each of the nodes N02-N12 in a point-to-point wireless network.

As field devices and controllers are implemented within a process control system, nodes are added to the network, be it a wireless mesh network or a wireless point-to-point network. Likewise, field devices and controllers may be taken offline or removed from the process control system, thus removing nodes from the network. As nodes are added or removed from a network, the communication paths may change. Accordingly, the gateway 102, workstation 104 and/or server 106 may periodically gather information about the network using various diagnostic tools in order to identify, define and/or update the communication paths/routes therein.

As is known, the gateway 102 may collect information about the network 100, including information about each node N01-N12. For example, as mentioned above with respect to a wireless mesh network 100, network manager software may be used to schedule communications and define communication paths within the network 100. In particular, the network manager defines communication paths for messages transmitted from the gateway 102 to the various nodes N01-N12, and vice versa. The communication paths are assigned by network manager using information received from each of the nodes N01-N12. As each node is introduced into the network, the node communicated with other nodes within range to determine its neighbors (i.e., other nodes or the gateway in direct active communication with the node). Each node measures the received signal strength, referred to as the received signal strength indicator (RSSI) which is a measure of the power of a received signal, during each communication with a neighbor, among other statistics regarding communications with its neighbors.

Information about each node's neighbors and corresponding RSSI may be transmitted to the gateway 102 and used by the network manager software. For example, the network manager software may use the neighbor information and RSSI information to determine the communication paths for incoming and outgoing messages. For each communication path, the network manager software identifies the neighboring nodes for the various hops in the path. The nodes within a communication path may be classified as a parent or a child, where a parent is a device that passes communications through itself for another device (its child), and a child is a device that communicates through another device (a parent) to reach a third device or gateway.

Each of nodes N01-N12 periodically reports its communication statistics to the gateway 102. These statistics are used by the network manager software to determine communication paths and assign time slots for messages. The communication statistics may include identification of neighbors, received signal strength indicators (RSSI) from each neighbor, received signal strength indicators (RSSI) to each neighbor, the percentage of successful communications with each neighbor, number of parents and children to that particular node, parent-to-children ratio, parent-to-neighbor ratio, and children-to-neighbor ratio, whether the node is within range of gateway 102, and whether the node is in direct communication with the gateway 102. Thus, using diagnostic tools, such as the network manager software, the communication paths within a mesh network may be determined.

For point-to-point wireless networks, each node is capable of collecting and transmitting communication statistics to the gateway 102, in which case the gateway 102 in a point-to-point network may be implemented with network manager software stored thereon. The network manager software receives from each node communication statistics including received signal strength indicators (RSSI) from each neighbor, received signal strength indicators (RSSI) to each neighbor, the percentage of successful communications with each neighbor, etc. Thus, in a point-to-point network, the communication path may likewise be determined using a diagnostic tool, such as the network manager software.

A further commonly used diagnostic tool is a tracing tool such as traceroute, which determines the route of communications in the network and measures transit delays of messages across the network. As is generally known, traceroute sends a sequence of echo request packets addressed to a destination node. Traceroute determines the intermediate nodes traversed in the communication path by adjusting time-to-live (TTL) (hop limit) network parameters. The TTL (hop limit) value is decremented at each node in the communication path, a packet discarded when the TTL value has reached zero, and an error message returned to the message origin indicating time exceeded. The TTL value (hop limit) is increased for each successive set of packets sent, where a first set of packets have a hop limit value of 1 with the expectation that they are not forwarded on by the first node. The first node then returns the error message back to the origin. The next set of packets have a hop limit value of 2, so that they are not forwarded beyond the second node in the communication path, and the second node sends the error reply. This continues until the destination node receives the packets and returns an echo reply message. Traceroute uses the returned messages to produce a list of nodes that the packets have traversed. The timestamp values returned for each node along the path are the delay (latency) values, typically measured in milliseconds. Thus, the number of hops and latency values may be determined for the network, and, in turn, the communication path may be determined for the network.

Figure 5:
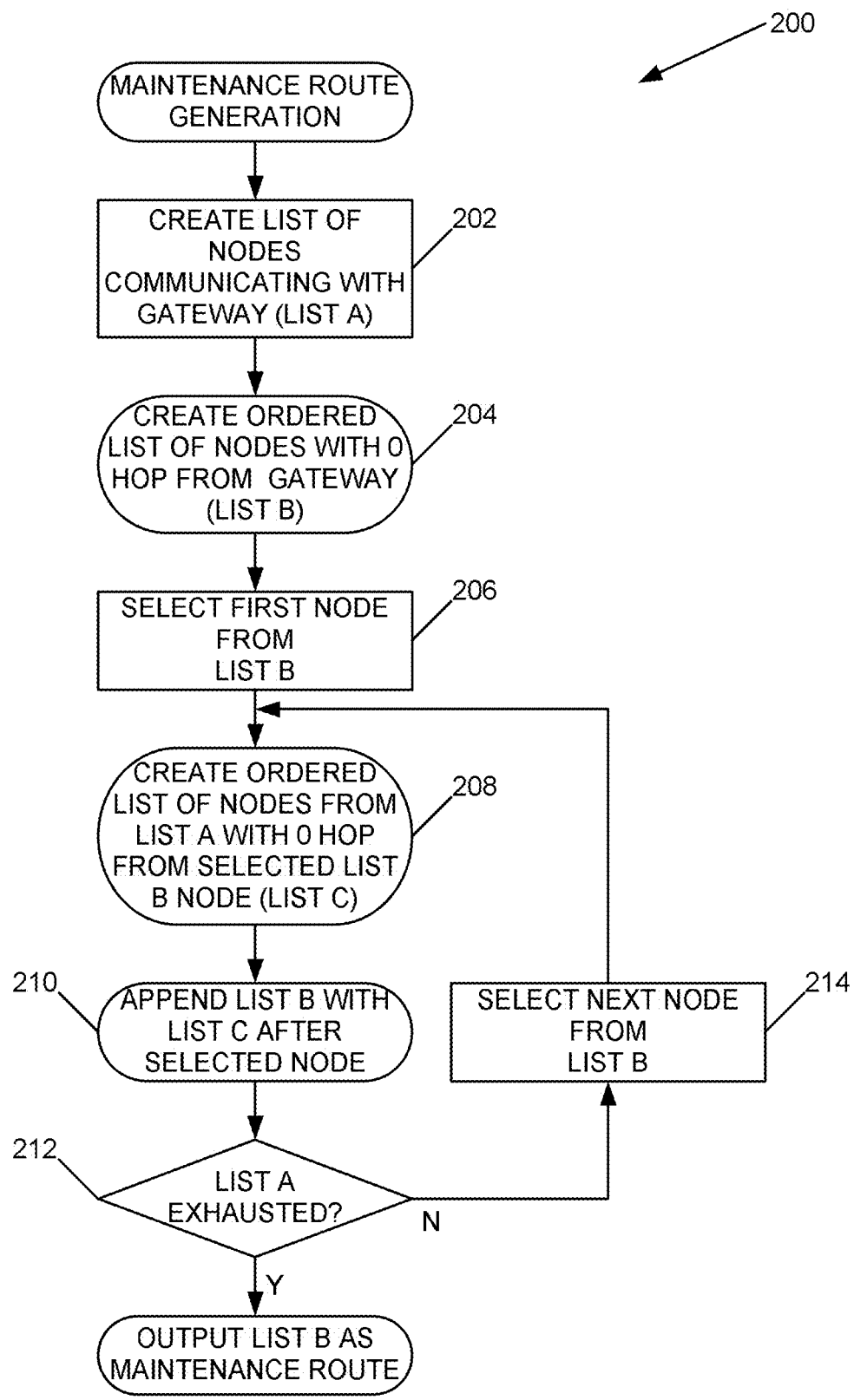
FIG. 5 is a flowchart of a maintenance route generation routine in accordance with this disclosure.

Referring now to FIG. 5, a maintenance route generation routine 200 for establishing maintenance routes through the process plant is disclosed. The maintenance route generation routine 200 utilizes information from the above-described diagnostic utilities, such as signal strength, hop count and latency, to automatically create and modify the maintenance routes. Generally, the routine 200 of FIG. 5 is executed on the back end of the Ethernet 108, such as on the workstation 104 or the server 106, for example. More specifically, the maintenance route generation routine 200 is implemented and executed as a tool on a maintenance computer. That is, a computer, such as a workstation 104 or server 106, designated for maintenance related activities and/or which executes an interface application to enable a maintenance person to interface with the process control network 10 within the plant. In one example, the maintenance route generation routine 200 may be implemented as a module of the interface application.

The process by which a maintenance route is established is based on a sequence of calculations relating to relative proximity that is derived from the signal strength and number of hops that occur in the communication path for a given set of field devices and controllers (nodes). That is, the proximity of nodes with respect to one another can be gleaned from the information about the network without having to know the physical location of each device. For example, referring to FIGS. 3 and 4, even if the actual distance between 1) node N01 and 2) nodes N02, N04, N05 and N06 is not known, it may nonetheless be determined from signal strength that node N04 is the closest to node N01 (i.e., node N04 has greater RSSI than nodes N05 or N06). Thus, while distance may not be determined from signal strength, it can provide an indication of which node is closest relative to another node, and hence which field device or controller is closest relative to another field device or controller.

It should be understood that a defined maintenance route does not strictly follow a communication path through the network 100. Often times there are many reasons why a communication route and maintenance route will differ. Where a maintenance route is established based on the relative physical proximity of nodes, communication routes may be partially based on proximity by virtue of a node's communication range (for example, the radio range of a wireless device) and based on logical communication parameters, such as avoiding pinch points. Nonetheless, the information used to determine communication routes is useful in determining maintenance routes. Further, while the following description relates to nodes within the network 100, it should readily be understood that field devices and controllers are the physical embodiments of the nodes, and that the term "nodes" may just as easily be substituted with the terms "field devices" and "controllers" within this context, where the field devices and controllers are implemented as wireless enabled field devices and controllers.

Figure 6:
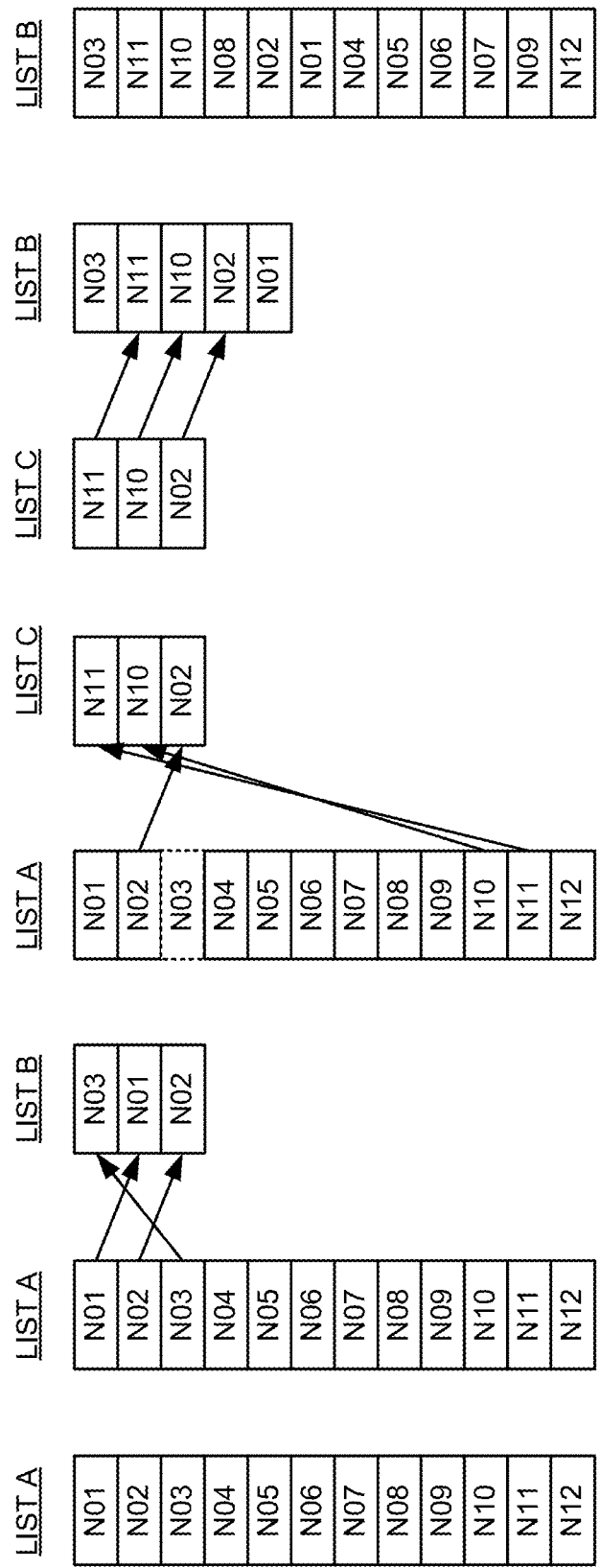
FIGS. 6A-6E are illustrations of the generation and progression of ordered lists generated from the routine of FIG. 5 as the routine executes various iterations of the lists for a wireless mesh network.

Referring to FIG. 5, a comprehensive list (List A) of all field devices and controllers communicating with the gateway, either directly or indirectly, is created at block 202 (see FIG. 6A). Generally speaking, the gateway 102 and the network manager software maintain a list of all nodes (and thus all field devices and controllers) in communication with the gateway 102, in order to identify, define and/or update the communication paths/routes therein. In addition or in the alternative, these lists may likewise be maintained by the workstation 104 and/or server 106. Accordingly, creating a list of all field devices and controllers communicating with the gateway 102 may be accomplished by retrieving the list of nodes N01-N12 created and maintained by the gateway 102 as part of its regular network diagnostics. At a minimum, existing information about the network 100 may be taken from the gateway 102 to create a list of all nodes N01-N12 within the network.

Once a list of all nodes communicating with the gateway is created, a primary ordered list (List B) is created at block 204 of all devices in direct communication with the gateway using the nodes listed in List A (see FIG. 6B). Using the results from the network diagnostics, the hop count of each node is known, as is the RSSI (or other indicator of signal strength) for each device relative to its neighbors. Specifically, List B is an ordered list of all nodes with 0 hops in their communication path arranged by signal strength. Referring to FIGS. 3 and 4, this would be nodes N03, N01 and N02 in that order, as each has a zero hop count with respect to the gateway 102, and of these the RSSI of N03 is strongest relative to the gateway 102, N01 is the next strongest and N02 is the weakest.

Figure 7:
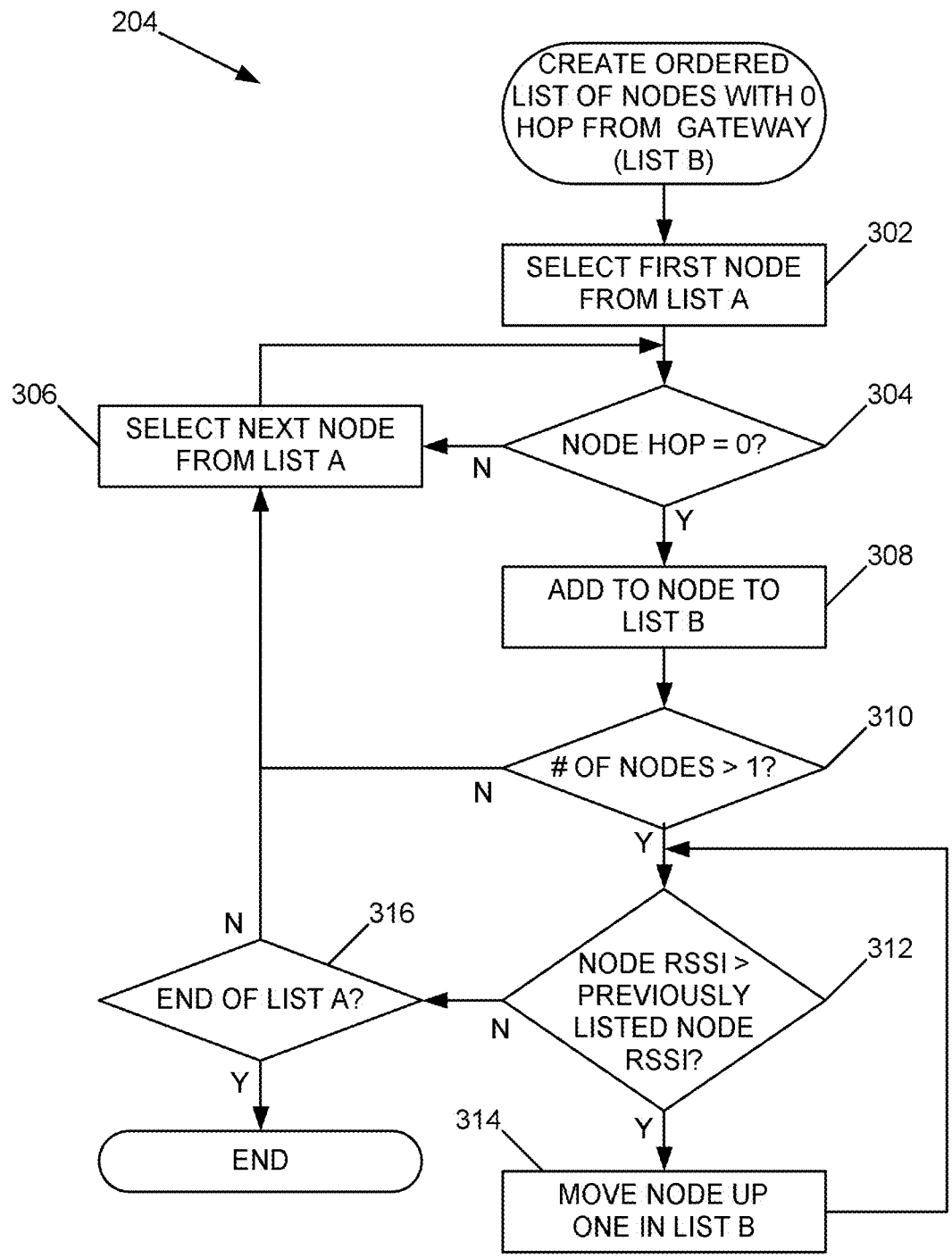
FIG. 7 is a flowchart of a routine from FIG. 5 for creating an ordered list of nodes in direct communication with a gateway.

FIG. 7 is a flowchart of an example of a routine 204 for creating an ordered list (List B) of nodes in direct communication with the gateway 102 (i.e., nodes with 0 hop from gateway 102). Using List A created at block 202 of FIG. 5, the routine 204 of FIG. 7 selects those nodes with 0 hop from the gateway 102 and ranks the nodes in List B according to a signal strength of the wireless connection between each node in List B and the wireless gateway network device, with higher signal strengths ranked ahead of weaker signal strengths. Referring to FIG. 7, the first node in List A (e.g., node N01) may be selected at block 302 with a determination being made at block 304 as to whether the selected node is in direct communication with the gateway 102 (i.e., is the hop for the node zero?). If not, the routine 204 moves on to the next node in List A and repeats the same determination at block 304.

If the node hop is zero with respect to the gateway 102, the node is added to the bottom of List B at block 308. If this is the first node added to List B, such a determination is made at block 310, whereby the routine 204 then selects the next node from List A at block 306. If this is a second or subsequent 0 hop node being added to List B, the routine 204 then proceeds to order the list according to signal strength with the gateway 102 at block 312.

In ordering the list according to signal strength, the signal strength of the added node (with the exception of the first node added to the list) is compared to the signal strength of the immediately preceding node listed in List B at block 312. This is performed with respect to each node in List B until the added node is ranked below a node having a higher signal strength. In particular, if the signal strength of the added node is higher than that of the node listed above it, the added node is moved up on spot in List B ahead of the node with the lower signal strength at block 314. The signal strength of the added node is then compared to the signal strength of the next node in the list, namely the node, if any, that now immediately precedes the added node after it was moved up one spot in the list. Again, if the signal strength of the added node is higher than that of the node now listed above it, the added node is moved up on spot in List B ahead of the node with the lower signal strength at block 314. This process continues until it is determined at block 312 that the added node does not have a signal strength stronger than that listed above it, at which point the next node from List A is selected at block 306, unless it is determined at block 316 that the end of List A has been reached, in which case control is returned to the maintenance route generation routine 200 of FIG. 5.

The result from the routine 204 of FIG. 7 is List B, which is a listing of nodes in direct communication with the gateway 102. For example, referring to FIGS. 3, 4 and 6A, the nodes in direct communication with the gateway 102 are node N01, N02 and N03. Using the routine 204 of FIG. 7, the first node selected by the routine 204 is node N01, where it is determined that node N01 has a zero hop count with respect to the gateway 102. Being the first node added to List B, the routine 204 proceeds to select the next node from List A, namely node N02. Having determined that node N02 has a zero hop count with respect to the gateway 102, node N02 is added to the end of List B, and the signal strength of node N02 with the gateway 102 is compared to that of node N01. Then, having determined that the signal strength of node N02 is less than that of node N01, the routine 204 selects the next node from List A, namely node N03. Node 03, having a zero hop count with the gateway 102, is added to the end of List B. The signal strength of node N03 is compared to that of node N02, whereby it is determined that node N03 has a stronger signal with the gateway 102 than node N02, so it is moved ahead of node N02 in List B. Subsequently, it is determined that the node N03 also has a strong signal than that of node 01, so node N03 is move to ahead of node N01 in the list. Each of nodes N04-N12 are then selected from List A, but each is determined to have a hop count of 1 or greater with respect to the gateway 102. What results is an ordered list of nodes in direct communication with the gateway 102 and arranged according to signal strength, namely N03, N01, N02 as shown in FIG. 6B. While the routine 204 is useful in creating this ordered list of nodes, it should be understood that the routine of FIG. 7 is but one example of creating an ordered list of nodes in direct communication with the gateway 102 arranged according to signal strength, and that other routines may be utilized.

Referring back to FIG. 5, the process of creating secondary ordered lists (List C) of nodes arranged according to signal strength is iteratively repeated for each node in direct communication with nodes in List B and arranged by signal strength. That is, for each node in List B created at block 204, the process is repeated for any node communicating directly with the node in List B. In particular, the first node listed in List B (i.e., node N03) is selected at block 206 of FIG. 5. From there, all nodes with 0 hops in their communication path with respect to node N03 (i.e., neighbors of node N03) are selected from List A and arranged by signal strength in List C. Referring to FIGS. 3, 4 and 6C, this would be nodes N11, N10 and N02 in that order, as each has a zero hop count with respect to node N03, and of these the RSSI of N11 is strongest relative to node N03, N10 is the next strongest and N02 is the weakest.

Figure 8:
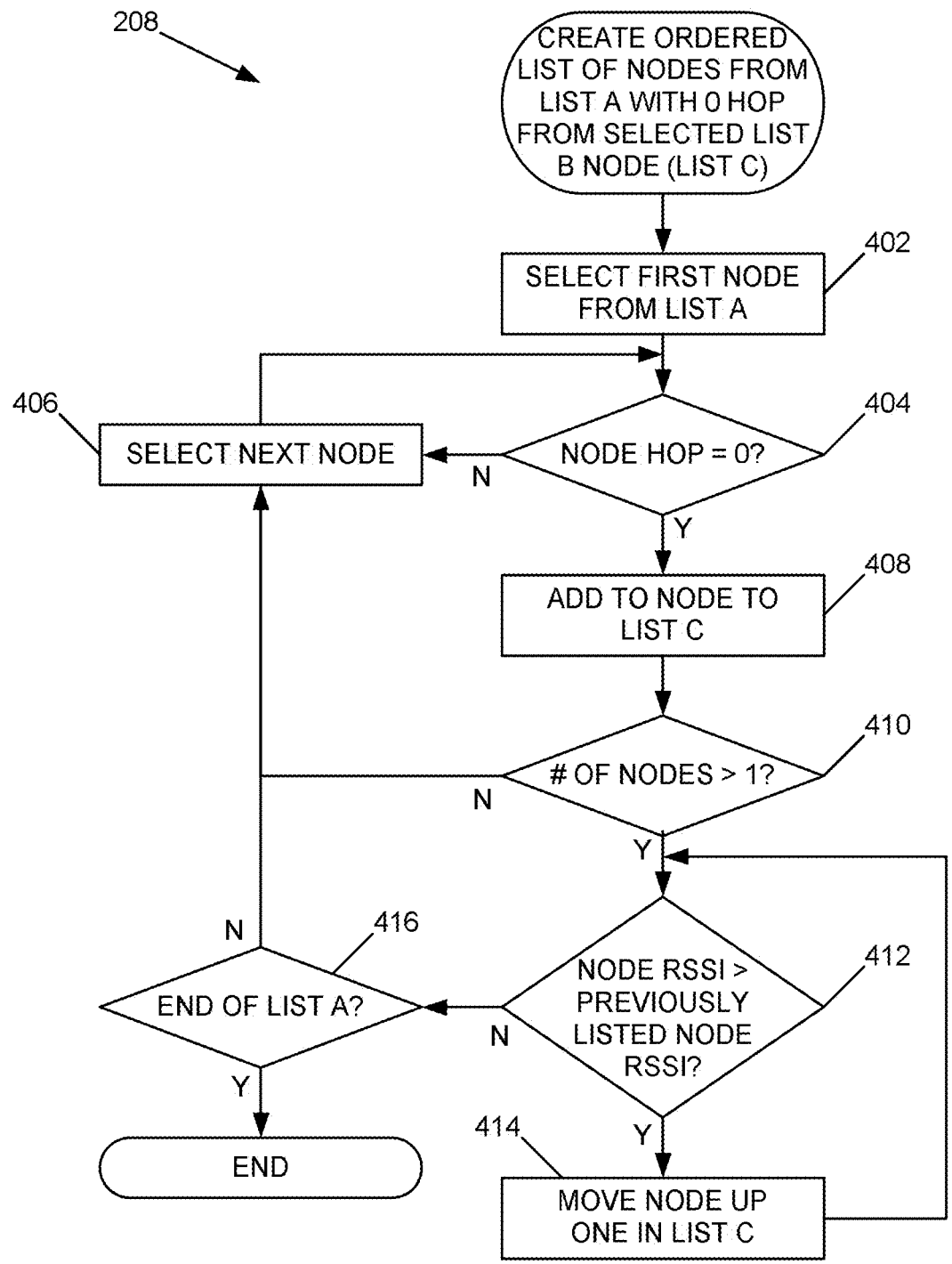
FIG. 8 is a flowchart of a routine from FIG. 5 for iteratively creating ordered lists of nodes in direct communication with a node from the list generated by the routine of FIG. 7 and as appended by the flowchart of FIG. 9.

FIG. 8 is a flowchart of an example of a routine 208 for creating an ordered list (List C) of nodes in direct communication with a node from List B (i.e., nodes with 0 hop from the selected node of List B). As will be seen, FIG. 8 is first discussed with respect to the first node from List B (node N03), and thereafter explained with respect to the other nodes in List B. Using List A created at block 202 of FIG. 5, the routine 208 of FIG. 7 selects those nodes with 0 hop from node N03 and ranks the nodes in List C according to a signal strength of the wireless connection between each node in List C and node N03, with higher signal strengths ranked ahead of weaker signal strengths. Referring to FIG. 8, the first node in List A (e.g., node N01) may be selected at block 402 with a determination being made at block 404 as to whether the selected node is in direct communication with node N03. If not, the routine 208 moves on to the next node in List A (e.g., node N02) and repeats the same determination at block 404.

If the node hop is zero with respect to node N03, the node is added to the bottom of List C at block 408. If this is the first node added to List C, such a determination is made at block 410, whereby the routine 208 then selects the next node from List A at block 406. If this is a second or subsequent 0 hop node being added to List C, the routine 208 then proceeds to order the list according to signal strength with node N03 at block 412. In this iteration, nodes N02, N10 and N11 are deemed to be in direct communication with node 03.

In ordering the list according to signal strength, the signal strength of the added node (with the exception of the first node added to the list) is compared to the signal strength of the immediately preceding node listed in List C at block 412. This is performed with respect to each node in List C until the added node is ranked below a node having a higher signal strength. In particular, if the signal strength of the added node is higher than that of the node listed above it, the added node is moved up on spot in List C ahead of the node with the lower signal strength at block 414. For example, in this iteration node N02 is the first node added to List C, as it is the first one selected from List A having a 0 hop count with respect to node N03. N10 is the next node added to List C.

The signal strength of the added node is then compared to the signal strength of the next node in the list, namely the node, if any, that now immediately precedes the added node after it was moved up one spot in the list. Again, if the signal strength of the added node is higher than that of the node now listed above it, the added node is moved up on spot in List C ahead of the node with the lower signal strength at block 414. For example, the signal strength of node N10 with respect to node N03 is compared to that of node N02, whereby it is determined that node N10 has the stronger signal and is moved ahead of node N02 in List C. Thus, List C is N10, N02 in that order. This process continues until it is determined at block 412 that the added node does not have a signal strength stronger than that listed above it, at which point the next node from List A is selected at block 406, unless it is determined at block 416 that the end of List A has been reached, in which case control is returned to the maintenance route generation routine 200 of FIG. 5. For example, node N11 is the next node selected from List A as being in direct communication with node N03 from List B. Node 11 is added to the end of List C, and its signal strength is compared to that of N02 (i.e., the immediately preceding node in List C). Node N11 has a strong signal than that of node N02, so it is moved ahead of node N02. The signal strength comparison is then performed between nodes N11 and N10, whereby node N11 is moved up to the top of List C ahead of node N10. The result from the routine 208 of FIG. 8 is List C, which is a listing of nodes in direct communication with node N03 and arranged according to signal strength with node N03, namely N11, N10 and N02 as shown in FIG. 6C. While the routine 208 is useful in creating this ordered list of nodes, it should be understood that the routine of FIG. 8 is but one example of creating an ordered list of nodes in direct communication with nodes from List B arranged according to signal strength, and that other routines may be utilized.

Referring back to FIG. 5, the ordered list of nodes in List C is appended to List B at block 210 after the node of List B for which the nodes of List C are in direct communication. For instance, continuing with the above example, the list of nodes N11, N10 and N02 is appended to List B after node N03, as shown in FIG. 6D. More specifically, nodes N11 and N10 are appended to List B after node N03, and node N02 is moved up in List B ahead of node N01, despite the earlier arrangement of node N01 ahead of node N02 (see FIG. 6B). This is because node N02 is already listed in List B.

Figure 9:
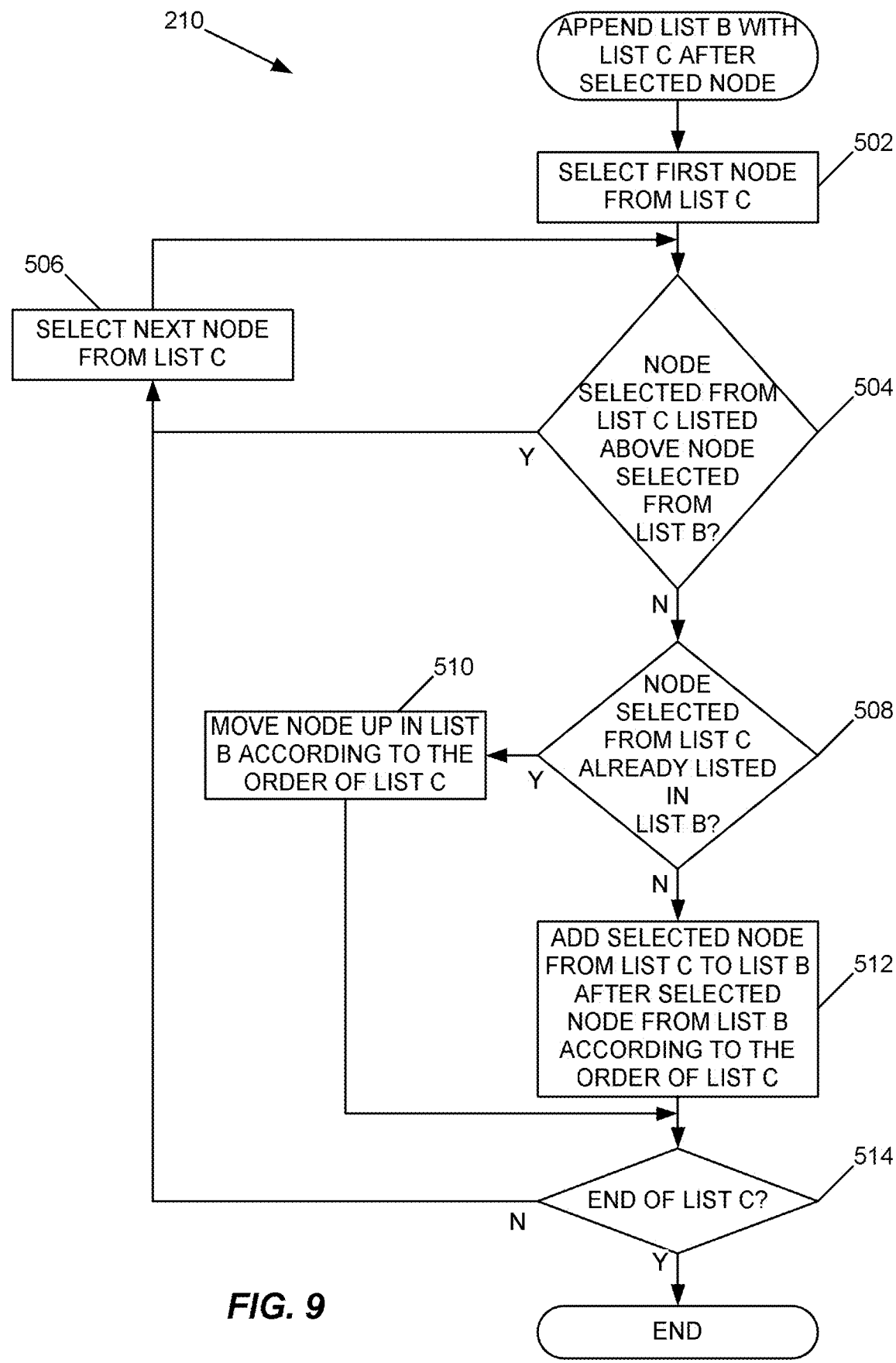
FIG. 9 is a flowchart of a routine from FIG. 5 for appending the list generated from the routine of FIG. 7 and as appended in previous iterations of the routine of FIG. 5.

FIG. 9 depicts a routine 210 for appending List B with List C after the node selected from List B. For the above example, this begins with the first node in List B as selected at block 206 of FIG. 5, namely node N03, but, as will be explain further, applies to all nodes subsequently selected from List B at block 214 of FIG. 5. Referring to FIG. 9, the first node from List C is selected by the routine at block 502, which, in the present example, is node N11. In order to avoid listing nodes multiple times (as would be the case with node N02 as it already exists in List B), the routine 210 proceeds to add nodes from List C and reorder the nodes in List B as needed to provide the most efficient physical maintenance route among the nodes. As such, at block 504 the routine 210 determines whether the node selected from List C is already listed above the node from List B selected in the maintenance route generation routine 200 of FIG. 5. If so, the node from List C is discarded or otherwise not appended to List B, and the routine 210 proceeds to select the next node from List C at block 506 and repeat the determination at block 504.

If the node selected from List C is not listed above the node selected from List B, then the routine determines whether the node selected from List C is already listed in List B at block 508 (as would be the case for node N02). If the node is already listed in List B, the node is moved up in the list in accordance with the order of nodes according to List C at block 510. Otherwise, the node is appended from List C to List B according to the order of nodes in List C at block 512. This process is repeated for each node in List C until then end of List C is reached as determined at block 514.

In the context of the example having been discussed herein, the routine 210 would first select node N11 from List C. As node N11 is not already listed above node N03 (the node selected from List B during the maintenance route generation routine 200 of FIG. 5), and is not already listed in List B, node N11 is added to List B after node N03. The next node in List C, node N10, is also not already listed above node N03 and not listed in List B, so it is added after node N11 in accordance with the order of List C. The last node selected from List C, node N02, is not already listed above node N03, but is already listed in List B. As such, it is moved up in List B in accordance with the order of List C, namely after node N10. Thus, using signal strength as an indicator, List B, in order of proximity, results in starting at node N03, and proceeding in order to nodes N11, N10, N02 and N01 as shown in FIG. 6D.

As previously mentioned, the process of creating ordered lists (List C) of nodes arranged according to signal strength is iteratively repeated for each node in direct communication with nodes in List B and arranged by signal strength. As each node in List B is selected and List B appended with neighboring nodes in direct communication with the node selected from List B, the selected node from List B may be considered exhausted from List A. That is, it need not be considered in further iterations of appending List B (as indicated by the hashed outline of node N03 in FIG. 6C). Thus, once all nodes from List A have been exhausted, List A is considered exhausted at block 212. Otherwise, the maintenance route generation routine 200 of FIG. 5 proceeds to select the next node from List B at block 214, which in the above example would now be node N11, and repeats the process of creating an ordered List C of nodes from List A in direct communication with the node selected from List B and arranged according to signal strength with the node selected from List B. The nodes of List C are again appended to List B as explained above until all nodes have been exhausted. As an alternative to exhausting List A, the maintenance route generation routine 200 of FIG. 5 may otherwise track the list of nodes in List B until it determines that no further node may be appended to List B.

Continuing with the above example, node N11 is selected at block 214, and neighboring nodes of node N11 are arranged according to signal strength at block 208. This results in a List C of N10 and N03. When appended to List B at block 210, node N10 is already listed in List B immediately after node N11, so it is not moved up any further. Node N03 is already listed above node N11, so it is not moved. The resulting appended List B is then N03, N11, N10, N02, N01.

The next node in List B is then N10, which has a List C of neighboring nodes N11, N08, N03, N02 and N12 in order of signal strength. When appended to List B, node N11 is already ranked ahead of node N10, so it is not moved. Node N08 is neither ranked ahead of node N11 nor listed in List B, so it is added to List B after node N10. Node N03 is already ranked ahead of node N10 in List B, so it is not moved. Node N02 is already listed in List B and is kept in place after node N08 in accordance with the order of List C for selected node N10. Node N12 is then added after node N02 also in accordance with the order of List C for selected node N10. The resulting appended List B is then N03, N11, N10, N08, N02, N12, N01.

In the next iteration, the next node in List B is Node 08 which has a List C of neighboring nodes N02, N07, N10 and N09 in order of signal strength. When appended to List B, node N02 is already listed in List B and is kept in place after node N08 in accordance with the order of List C for selected node N08. Node N07 is added to List B after Node 02 also in accordance with the order of List C, node N10 is already ranked ahead of node N08 so it is kept in place, and node N09 is added to List B after node N07 in accordance with the order of List C. The resulting appended List B is then N03, N11, N10, N08, N02, N07, N09, N12, N01.

In the following iteration, the next node in List B is Node 02 which has a List C of neighboring nodes N08, N01, N10, N07, N03 in order of signal strength. When appended to List B, node N08 is already listed ahead of node N02 in List B and is kept in place. Node N01 is already listed in List B, and is moved up after Node N02 in accordance with the order of List C. Node N10 is already ranked ahead of node N02 so it is kept in place. Node 07 is already listed in List B and remains listed after node N01 in accordance with the order of List C. Node N03 is already ranked ahead of node N02 so it is kept in place. The resulting appended List B is then N03, N11, N10, N08, N02, N01, N07, N09, N12.

In the subsequent iteration, the next node in List B is Node 01 which has a List C of neighboring nodes N04, N02, N06, N05 in order of signal strength. Node N04 is added to List B after Node 01 in accordance with the order of List C. Node 02 is already ranked ahead of node N01 in List B. Nodes N06 and N05 are added to List B after Node N04 in accordance with the order of List C. The resulting appended List B is then N03, N11, N10, N08, N02, N01, N04, N06, N05, N07, N09, N12.

The next node in List B is Node 04 which has a List C of neighboring nodes N05, N01 and N06 in order of signal strength. Each of nodes N05, N01 and N06 are already listed in List B, with node N01 already being ranked ahead of node N04. Node N05 is moved ahead of node N06 based on the order of List C. The resulting appended List B is then N03, N11, N10, N08, N02, N01, N04, N05, N06, N07, N09, N12.

Subsequent iterations do not result in any further changed to appended List B thereafter. Accordingly, as the maintenance route generation routine 200 of FIG. 5 proceeds through the remaining iterations for nodes N05, N06, N07, N09 and N12, List A is exhausted and the final List B is as follows: N03, N11, N10, N08, N02, N01, N04, N05, N06, N07, N09, N12 as shown in FIG. 6E. This final List B is then outputted as what is considered to be the most efficient maintenance route among the nodes, and hence among the field devices and controllers associated with each node, where the order of the nodes in List B is the order of the maintenance route and the location of each corresponding field device or controller corresponds to a stop point in the route. Thus, using network diagnostic information such as hop counts to identify neighboring nodes and the signal strength of the neighboring nodes as an indicator of proximity, a maintenance route may be generated for maintenance personnel to physically walk through the process plant to perform various maintenance and calibration activities as defined by the maintenance route.

Various modifications and/or utilizations may be made with the maintenance route. For example, while the maintenance route generation routine 200 of FIG. 5 may be considered the most optimal route through the process plant (or at least through the field devices and controller of the network 100), maintenance personnel may modify the route as needed, for example based on certain field devices or controllers needing quicker maintenance than others. In other example, the maintenance route may be modified to remove nodes that correspond with field devices and/or controllers that do not require maintenance or calibration.

At a minimum, the maintenance route may be displayed over on a map of the process plant on a display screen, such as a display screen of the workstation 104 or on a handheld device having a display screen, such as a smartphone, tablet pc, personal digital assistant or other portable display device. In particular, where each node is associated with a field device or controller and the location of the field device or controller is known, the field devices and controllers may be shown on a map of the process plant. For example, Citrano, III, U.S. Patent Application Publication No. 2009/0265635 entitled "System For Visualizing Design and Organization of Wireless Mesh Networks In Physical Space," filed Feb. 27, 2009 and published Oct. 22, 2009, the content of which is expressly incorporated by reference herein, discloses a visualization tool that display devices included in a mesh network with respect to the physical space occupied by the network. The tool receives an image representing the physical space occupied by the wireless mesh network, scale information defining the scale of the received image, and location information defining the location of each device within the physical space occupied by the network. Based on these inputs, the visualization tool displays the layout of the wireless mesh network with respect to the physical space occupied by the wireless mesh network. Using this tool, the maintenance route generated by the maintenance route generation routine 200 may be overlaid on the display of the layout of the mesh network, with arrows indicating the ordered route from node to node, and hence device to device, as conceptually shown in FIG. 10.

Further, maintenance routes generated by the maintenance route generation routine 200 may be updated on the basis of field devices or controllers (and hence nodes) being added or removed from the network 100. For example, having established a maintenance route, a new node N13 may be added to the network 100 having neighbors N08, N10, N12 and N09 as its neighbors in order of signal strength. Rather than repeat the process for each of the nodes within the network, which can number in the dozens or hundreds, the process may be executed with just the new node and its neighbors. That is, having neighbors N08, N10, N12 and N09, List A may be created with nodes N08, N09, N10, N12 and N13. Having an already established maintenance route as defined by List B from above, blocks 202-206 may be skipped, as these are essentially for initialization of List B.

As should be understood, the introduction of a new node into the network 100 may change the optimal route for maintenance, as the new node N13 may be now closer to existing nodes than previous neighbors. For example, node N13 may now be the closest neighbor of node N08, where previously node 02 was the closest neighbor to N08 Likewise, node N13 may now be the second closest neighbor of node N10, where previously node N08 was the second closest neighbor. In order to arrange the nodes in optimal order for a maintenance route based on proximity, the process is repeated for each node in List B that communicates directly with new Node N13, namely nodes N08, N09, N10 and N12. Thus, beginning with node N10 (as node N10 is the first listed in List B among nodes N08, N09, N10 and N12 *n* (see FIG. 6E)), a List C may be created of all of node N10's neighbors in order of signal strength, which now includes new node N13 (e.g., N11, N13, N08, N03, N02, N12). The List C may then be appended to List B as disclosed above, thereby introducing new node N13 to List B. The process is then repeated for nodes N08, N09, N10 and N12 and also for node N13, to finalize List B and establish a modified maintenance route.

Should a field device or controller (and hence node) be removed from the network 100, the node may be removed from List B, and a similar process may be carried out for those nodes that were neighbors of the removed node. Thus, without having to execute the maintenance route generation routine 200 for all nodes in the network 100, an existing maintenance route may be modified to account only for those nodes affected by the introduction or removal of another node.

While the above example has been described with respect to the wireless mesh network of FIG. 3 as indicated by the broken communication lines, the maintenance route generation routine 200 is likewise applicable to wireless point-to-point wireless networks, such as that shown by the solid communication lines in FIG. 3. For example, using the maintenance route generation routine 200, List A is created at block 202 (FIG. 11A), similar to that shown in FIG. 6A. Using the routine of FIG. 7 for creating an ordered list (List B) of nodes in direct communication with the gateway 102 at block 204, an ordered List B (FIG. 11B) is created of nodes with a 0 hop count from the gateway 102 (i.e., nodes N03, N01, N02) and arranged in order of signal strength with the gateway 102, similar to that shown in FIG. 6B.

Selecting the first node from List B (i.e., node N03) at block 206, the maintenance route generation routine 200 then creates an ordered List C (FIG. 11C) of nodes with a 0 hop count from the selected node from List B (i.e., node N03) and arranged in order of signal strength with the selected node from List B at block 208 using the routine of FIG. 8 for creating an ordered list (List C) of nodes in direct communication with a node from List B. However, unlike the List C for selected node N03 from List B in the example of the mesh wireless network above (see FIG. 6C), the list does not include node N02, because in the point-to-point network example of FIG. 3 only node N10 and N11 are neighbors with node N03. Thus, List C for selected node N03 includes nodes N11 and N10 in order of signal strength.

Figure 11:
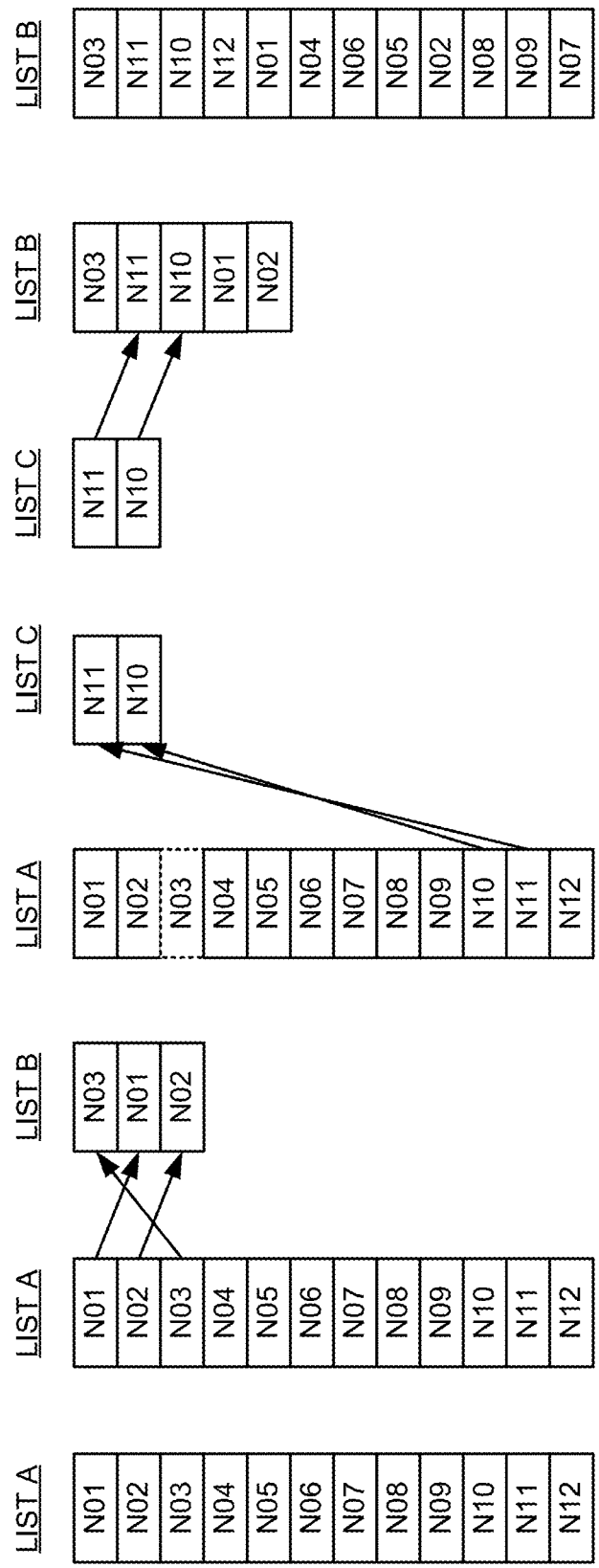
FIGS. 11A-11E are illustrations of the generation and progression of ordered lists generated from the routine of FIG. 5 as the routine executes various iterations of the lists for a wireless point-to-point network.

At block 210, List C for selected node N03 is appended to List B according to the routine 210 for appending List B with List C after the node selected from List B, resulting in the List B of FIG. 11D. Node N02 remains in List B from the initial creation of ordered List B, but contrasted with FIG. 6D, it remains ranked behind Node 01. Thereafter, the maintenance route generation routine 200 determines whether each node has been accounted for at block 212, and selects the next node from List B at block 214 if needed.

Continuing with the present example, once List B has been appended for selected node N03, the next node in appended List B is now node N11, which has only one neighbor, node N03. Given that node N03 is already listed ahead of node N11, the routine 200 moves on to node N10 without appending List B after going through the steps of routines 208 and 210. The next node in List B is now node N10, which has neighboring nodes N03 and N12. Using the process of FIG. 8 at block 208, List C for selected node N10 from List B results in nodes N03 and N12 in order of signal strength. Using the process of FIG. 9 at block 210, List C is appended to List B after node N10, where node N03 is already ranked ahead of node N10 and node N12 is ranked below node N10. The resulting appended ordered List B is then nodes N03, N11, N10, N12, N01, N02.

As with the mesh network example above, the maintenance route generation routine 200 repeats blocks 208, 210, 212 and 214 for the nodes in a wireless point-to-point network. However, the resulting ordered lists are different than for a wireless mesh network. For example, once List B has been appended for selected node N10, the next node in List B is node N12, which has only one neighbor, node N10. Given that node N10 is already listed ahead of node N12, the routine 200 moves on to node N01 without appending List B after going through the steps of routines 208 and 210. At this point, node N01 is selected from List B, which has neighbors N04, N05 and N06, resulting in an ordered List C of nodes N04, N06, N05 and an appended List B of N03, N11, N10, N12, N01, N04, N06, N05, N02. Because each of nodes N04, N05 and N06 only have node N01 as a neighbor, and because node N01 is already ranked ahead of these nodes in ordered List B, the resulting iterations for nodes N04, N06, N05 (as they are selected in order from List B) do not result in any changes to ordered List B). Thereafter, node N02 is selected resulting in nodes N08 and N07 being appended to List B, in that order. In the following iteration, node N09 is appended to List B after node N08. Node N07 has no neighbors that are not already ranked ahead of it in List B. Thus, List A is exhausted, resulting in a final List B of nodes N03, N11, N10, N12, N01, N04, N06, N05, N02, N08, N09, N07 as shown in FIG. 11E.

Figure 12:
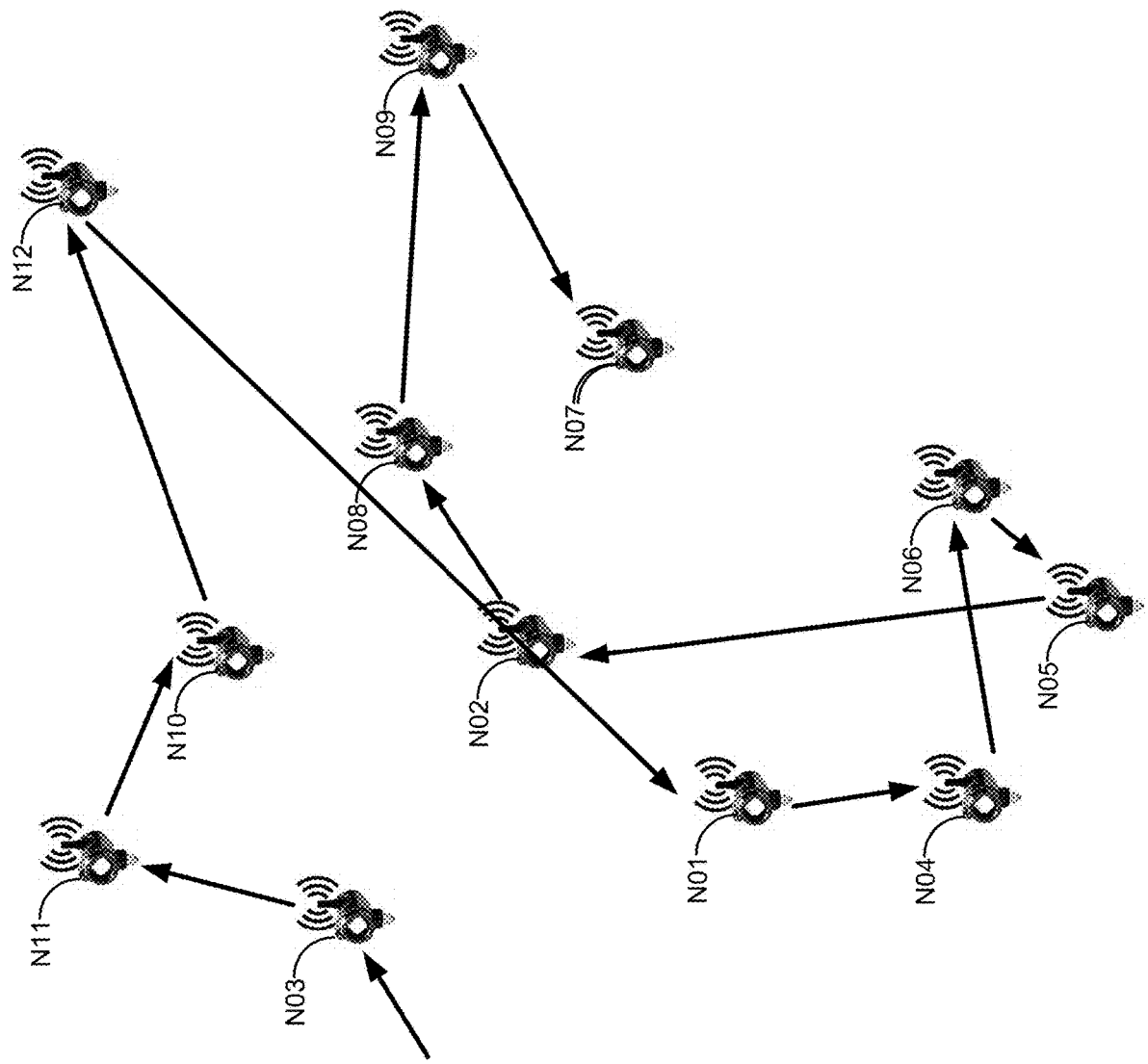
FIG. 12 is a schematic diagram showing a maintenance route through the wireless point-to-point network communication environment of FIG. 3 as generated by the routine of FIG. 5.

As above, this List B is outputted as the order of the maintenance route for devices corresponding to the nodes. The list may be updated to account for nodes added or removed from the wireless point-to-point network as described above for the wireless mesh network, and may be overlaid on a display of the layout of the wireless point-to-point network, with arrows indicating the ordered route from node to node, and hence device to device, as shown in FIG. 12. It is noted, however, that this may not represent the most optimum route through the network.

Figure 10:
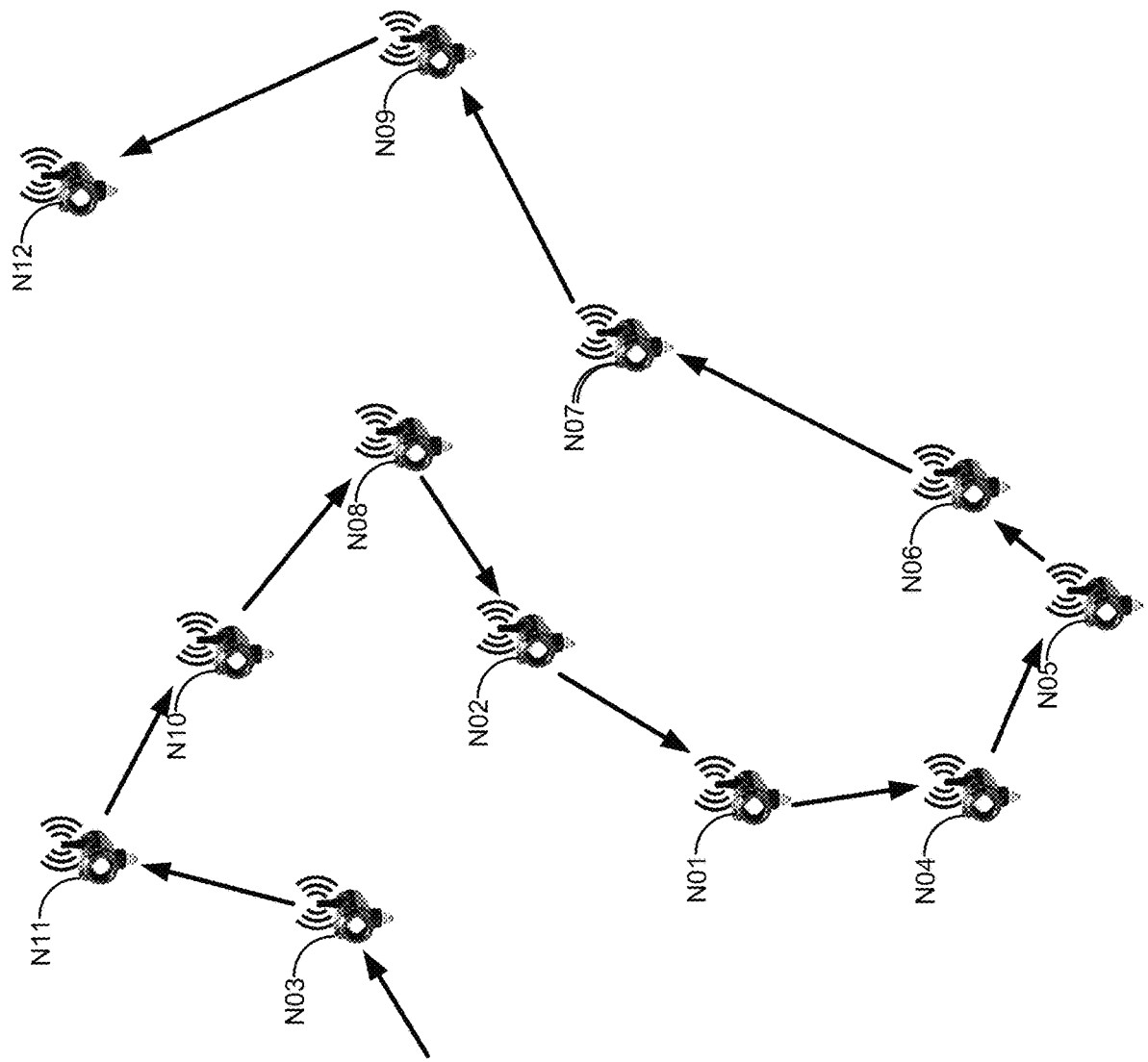
FIG. 10 is a schematic diagram showing a maintenance route through the wireless mesh network communication environment of FIG. 3 as generated by the routine of FIG. 5.

In particular, compared to the route shown in FIG. 10, which is considered a more optimum route, if not the most optimum route, the route shown in FIG. 12 may be considered less optimal in terms of distance to be traversed by a maintenance person, even though the nodes (and devices) are physically positioned the same in both instances. For example, the leg from node N12 to node N01 bypasses node N02. Moreover, the leg from node N05 to node N02 crosses over the leg from node N04 to node N06. In short, the route outputted by the maintenance route generation routine 200 for a wireless point-to-point network may not be the most optimum route. Thus, just as maintenance personnel may modify the route based on certain field devices or controllers needing quicker maintenance than others or to remove nodes that correspond with field devices and/or controllers that do not require maintenance or calibration, the route outputted by the maintenance route generation routine 200 for a wireless point-to-point network may be reviewed and adjusted by maintenance personnel to account for more optimal paths. Nonetheless, whereas previously maintenance routes were generated manually, the maintenance route generation routine 200 may, at a minimum, automatically generate a maintenance route for either wireless mesh networks or point-to-point networks, or a combination thereof, that may be used as an initial list of ordered stop points for maintenance personnel to use for physically walking through a plant and perform tasks, such as gathering data, calibrating device, performing visual equipment inspection, etc.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

While the maintenance route generation technique, and its elements, has been described as routines that may be implemented on a workstation or server, they may also be implemented in hardware, firmware, etc., and may be implemented by any other processor, including multiple processors. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of automatically generating an ordered physical route in a process control system, wherein the process control system includes a wireless gateway network device and a first plurality of process devices in wireless communication with the wireless gateway network device, the method implemented via one or more processors, the method comprising:

determining a signal strength of a wireless connection between each process device of the first plurality of process devices and the wireless gateway network device and/or between each process device of the first plurality of process devices and another process device;

for each process device, beginning with a first process device, in an initial list of a second plurality of process devices in direct wireless communication with the wireless gateway network device, where the second plurality of process devices of the initial list are ranked therein according to a signal strength of a wireless connection with the wireless gateway network device, iteratively selecting the process devices from the initial list of the second plurality of process devices;

with each iteration, appending the initial list of the second plurality of process devices with the remaining process devices from the first plurality of process devices until each of the first plurality of process devices are included in the appended initial list by:

creating a subsequent list of a third plurality of process devices in direct wireless communication with the process device selected from the initial list, wherein the third plurality of process devices of the subsequent list are ranked therein according to a signal strength of a wireless connection with the process device selected from the initial list; and appending the initial list with the third plurality of process devices in the subsequent list, wherein each process device appended to the initial list is ranked therein after the process device selected from the initial list according to the signal strength of its wireless connection with the process device selected from the initial list, unless the process device from the subsequent list is already ranked in the initial list ahead of the selected process device from the initial list;

generating an ordered physical walking route of traversal through a process plant in which the first plurality of process devices are disposed, including a plurality of ordered stop points corresponding to each of the first plurality of process devices according to the order of the first plurality of process devices in the appended list; and displaying the ordered physical walking route of traversal through the process plant.

2. The method of claim 1 further comprising creating the initial list of process devices in direct wireless communication with the wireless gateway network device, where the process devices of the initial list are ranked therein according to the signal strength of the wireless connection between each process device in the initial list and the wireless gateway network device, with higher signal strengths ranked ahead of weaker signal strengths.

3. The method of claim 1, wherein for a process device from the subsequent list that is already ranked in the initial list from a previous iteration of the initial list, appending the initial list comprises re-ranking the already-ranked process device in the initial list after the selected process device from the initial list according to the signal strength of its wireless connection with the process device selected from the initial list.

4. The method of claim 1, further comprising measuring the signal strength of a wireless connection between each process device in direct wireless communication with the wireless gateway network device and the wireless gateway network device, wherein the signal strength is interpreted as correlating to the physical proximity of the process device to the wireless gateway network device.

5. The method of claim 1, further comprising measuring the signal strength of a wireless connection between each process device in direct wireless communication with another process device, wherein the signal strength is interpreted as correlating to the physical proximity of the process devices.

6. The method of claim 1, wherein a start of the ordered physical route comprises the physical location within the process control system of the process device first listed in the appended initial list, wherein the process device first listed in the appended initial list corresponds to the process device having the strongest signal strength with the wireless network gateway device.

7. The method of claim 1, further comprising displaying the ordered physical route on a display screen of a client computing device.

8. The method of claim 7, wherein the client computing device comprises a handheld device.

9. The method of claim 1, further comprising mapping the ordered physical route over a map of the process control system.

10. The method of claim 1, further comprising identifying process devices along a communication route within a wireless network, wherein each of the process devices in the initial list comprises a first process device along a communication route from the wireless network gateway device.

11. The method of claim 10, wherein identifying process devices along a communication route within the wireless network comprises identifying process devices along a communication route within the wireless network using traceroute.

12. A method of generating an ordered physical route in a process control system, wherein the process control system includes a wireless network comprising a wireless gateway network device and a first plurality of wireless network nodes, each of which is in wireless communication with the wireless gateway network device either directly or via another wireless network node, the method implemented on one or more processors, the method comprising:

determining a signal strength of a wireless connection between each wireless network node of the first plurality of wireless network nodes and the wireless gateway network device and/or between each wireless network node of the first plurality of wireless network nodes and another wireless network node;

creating a primary ordered list of a second plurality of wireless network nodes in direct wireless communication with the wireless gateway network device, wherein the second plurality of wireless network nodes comprising the primary ordered list are organized according to decreasing signal strength with the wireless gateway network device;

iteratively appending the primary ordered list with the remaining wireless network nodes of the first plurality of wireless network nodes, wherein each iteration comprises:

selecting a wireless network node from the previous iteration of the primary ordered list;

creating a secondary ordered list of a third plurality of wireless network nodes in direct wireless communication with the selected wireless network node, wherein the wireless network nodes comprising the secondary ordered list are organized according to decreasing signal strength with the selected wireless network node; and appending the primary ordered list with the wireless network nodes of the secondary ordered list after the selected wireless network node;

generating an ordered physical walking route of traversal through a process plant in which the first plurality of wireless network nodes are disposed, including a plurality of ordered stop points corresponding to each of the first plurality of wireless network nodes according to the order of the first plurality of wireless network nodes in the appended list; and displaying the ordered physical walking route of traversal through the process plant.

13. The method of claim 12, wherein creating a primary ordered list comprises:

selecting a wireless network node from among the first plurality of wireless network nodes;

determining the hop count of the selected wireless network node with respect to the wireless gateway network device;

adding the selected wireless network node to the end of the primary ordered list if the hop count is zero;

comparing a received signal strength indicator (RSSI) of the selected wireless network node to an RSSI of a wireless network node preceding the selected wireless network node in the primary list; and re-organizing the primary list to rank the selected wireless network node ahead of the preceding wireless network node if the RSSI of the selected wireless network node is greater than the RSSI of the preceding wireless network node.

14. The method of claim 12, wherein creating a secondary ordered list comprises:

selecting a wireless network node from among the first plurality of wireless network nodes;

determining the hop count of the selected wireless network node with respect to the wireless network node selected from the previous iteration of the primary ordered list;

adding the selected wireless network node to the end of the secondary ordered list if the hop count is zero;

comparing a received signal strength indicator (RSSI) of the selected wireless network node from the first plurality of wireless network nodes to an RSSI of a wireless network node preceding the selected wireless network node from the first plurality of wireless network nodes in the secondary ordered list; and re-organizing the secondary ordered list to rank the selected wireless network node from the first plurality of wireless network nodes ahead of the preceding wireless network node if the RSSI of the selected wireless network node from the first plurality of wireless network nodes is greater than the RSSI of the preceding wireless network node.

15. The method of claim 12, wherein appending the primary ordered list comprises:

selecting a wireless network node from the secondary ordered list;

determining whether the wireless network node selected from the secondary ordered list is already ranked above the wireless network node selected from the previous iteration of the primary ordered list in the previous iteration of the primary ordered list;

determining whether the wireless network node selected from the secondary ordered list is already ranked in the previous iteration of the primary ordered list if the wireless network node selected from the secondary ordered list is not ranked above the wireless network node selected from the previous iteration of the primary ordered list in the previous iteration of the primary ordered list;

adding the wireless network node selected from the secondary ordered list to the primary ordered list after the wireless network node selected from the previous iteration of the primary ordered list according to the order of wireless network nodes in the secondary ordered list if the wireless network node from the secondary ordered list is not already ranked in the previous iteration of the primary ordered list; and re-organizing the primary ordered list to rank the wireless network node selected from the secondary ordered list after the wireless network node selected from the previous iteration of the primary ordered list according to the order of wireless network nodes in the secondary ordered list if the wireless network node from the secondary ordered list is already ranked in the previous iteration of the primary ordered list.

16. The method of claim 12, wherein a start of the ordered physical route comprises the physical location within the process control system of the process device corresponding to the wireless network node first listed in the appended primary ordered list, wherein the wireless network node first listed in the appended primary ordered list corresponds to the wireless network node having the strongest signal strength with the wireless network gateway device.

17. The method of claim 12, further comprising displaying the ordered physical route on a display screen of a client computing device.

18. The method of claim 17, wherein the client computing device comprises a handheld device.

19. The method of claim 12, further comprising mapping the ordered physical route over a map of the process control system.

20. A system for automatically generating an ordered physical route in a process control system, wherein the process control system includes a wireless gateway network device and a first plurality of wireless network nodes in wireless communication with the wireless gateway network device, the system comprising:

a server comprising a processor, a memory operatively coupled to the processor and a server communication transceiver;

client computing device comprising a display, a microprocessor and a wireless transceiver communicatively coupled to the server via the wireless transceiver;

a routine stored in the memory and adapted to be executed by the processor to determine a signal strength of a wireless connection between each wireless network node of the first plurality of wireless network nodes and the wireless gateway network device and/or between each wireless network node of the first plurality of wireless network nodes and another wireless network node;

a routine stored in the memory and adapted to be executed by the processor to iteratively select wireless network nodes from an initial list of a second plurality of wireless network nodes in direct wireless communication with the wireless gateway network device beginning with the first wireless network node, where the second plurality of wireless network nodes of the initial list are ranked therein according to a signal strength of a wireless connection with the wireless gateway network device;

a routine stored in the memory and adapted to be executed by the processor to, for each iteration, create a subsequent list of a third plurality of wireless network nodes in direct wireless communication with the wireless network node selected from the initial list, wherein the third plurality of wireless network nodes of the subsequent list are ranked therein according to a signal strength of a wireless connection with the wireless network node selected from the initial list;

a routine stored in the memory and adapted to be executed by the processor to, for each iteration, append the initial list with the third plurality of wireless network nodes in the subsequent list, wherein each wireless network node appended to the initial list is ranked therein after the wireless network node selected from the initial list according to the signal strength of its wireless connection with the wireless network node selected from the initial list, wherein the appended initial list including the first plurality of wireless network nodes relates to an ordered physical route among the wireless network nodes;

a routine stored in the memory and adapted to be executed by the processor to generate an ordered physical walking route of traversal through a process plant in which the first plurality of wireless network nodes are disposed, including a plurality of ordered stop points corresponding to each of the first plurality of process devices according to the order of the plurality of process devices in the appended list; and a routine stored in the memory and adapted to be executed by the processor to display the ordered physical walking route of traversal through the process plant.

21. The system of claim 20, further comprising a routine stored in the memory and adapted to be executed by the processor to create the initial list of wireless network nodes in direct wireless communication with the wireless gateway network device, wherein the wireless network nodes comprising the initial list are organized according to decreasing signal strength with the wireless gateway network device.

22. The system of claim 20, wherein the routine to create the initial list of wireless network nodes comprises:

a routine stored in the memory and adapted to be executed by the processor to select a wireless network node from among the first plurality of wireless network nodes;

a routine stored in the memory and adapted to be executed by the processor to determine the hop count of the selected wireless network node with respect to the wireless gateway network device;

a routine stored in the memory and adapted to be executed by the processor to add the selected wireless network node to the end of the initial list if the hop count is zero;

a routine stored in the memory and adapted to be executed by the processor to compare a wireless connection signal strength of the selected wireless network node to a wireless connection signal strength of a wireless network node preceding the selected wireless network node in the initial list; and a routine stored in the memory and adapted to be executed by the processor to re-organize the initial list to rank the selected wireless network node ahead of the preceding wireless network node if the wireless connection signal strength of the selected wireless network node is greater than the wireless connection signal strength of the preceding wireless network node.

23. The system of claim 20, wherein the routine stored to create a subsequent list comprises:

a routine stored in the memory and adapted to be executed by the processor to select a wireless network node from among the first plurality of wireless network nodes;

a routine stored in the memory and adapted to be executed by the processor to determine the hop count of the selected wireless network node with respect to the wireless network node selected from the previous iteration of the initial list;

a routine stored in the memory and adapted to be executed by the processor to add the selected wireless network node to the end of the subsequent list if the hop count is zero;

a routine stored in the memory and adapted to be executed by the processor to compare a wireless connection signal strength of the selected wireless network node from the first plurality of wireless network nodes to a wireless connection signal strength of a wireless network node preceding the selected wireless network node from the first plurality of wireless network nodes in the subsequent list; and a routine stored in the memory and adapted to be executed by the processor to re-organize the subsequent list to rank the selected wireless network node from the first plurality of wireless network nodes ahead of the preceding wireless network node if the wireless connection signal strength of the selected wireless network node from the first plurality of wireless network nodes is greater than the wireless connection signal strength of the preceding wireless network node.

24. The system of claim 20, wherein the routine stored to append the initial list comprises:

a routine stored in the memory and adapted to be executed by the processor to select a wireless network node from the subsequent list;

a routine stored in the memory and adapted to be executed by the processor to determine whether the wireless network node selected from the subsequent list is already ranked above the wireless network node selected from the previous iteration of the initial list in the previous iteration of the initial list;

a routine stored in the memory and adapted to be executed by the processor to determine whether the wireless network node selected from the subsequent list is already ranked in the previous iteration of the initial list if the wireless network node selected from the subsequent list is not ranked above the wireless network node selected from the previous iteration of the initial list in the previous iteration of the initial list;

a routine stored in the memory and adapted to be executed by the processor to add the wireless network node selected from the subsequent list to the initial list after the wireless network node selected from the previous iteration of the initial list according to the order of wireless network nodes in the subsequent list if the wireless network node from the subsequent list is not already ranked in the previous iteration of the initial list; and a routine stored in the memory and adapted to be executed by the processor to re-organize the initial list to rank the wireless network node selected from the subsequent list after the wireless network node selected from the previous iteration of the initial list according to the order of wireless network nodes in the subsequent list if the wireless network node from the subsequent list is already ranked in the previous iteration of the initial list.

25. The system of claim 20, wherein a start of the ordered physical route comprises the physical location within the process control system of the process device corresponding to the wireless network node first listed in the appended initial list, wherein the wireless network node first listed in the appended initial list corresponds to the wireless network node having the strongest signal strength with the wireless network gateway device.

26. The system of claim 20, further comprising a routine stored in the client computing device and adapted to be executed by the microprocessor to display the ordered physical route on the display.

27. The system of claim 20, further comprising a routine stored in the memory and adapted to be executed by the processor to map the ordered physical route over a map of the process control system.

* * * * *

UNITED STATES PATENT AND TRADEMARK OFFICE
CERTIFICATE OF CORRECTION

| | | |
|---|---|---|
| PATENT NO. | : 12,014,300 B2 | Page 1 of 1 |
| APPLICATION NO. | : 17/136866 | |
| DATED | : June 18, 2024 | |
| INVENTOR(S) | : Steven R. Dillon | |

It is certified that error appears in the above-identified patent and that said Letters Patent is hereby corrected as shown below:

In the Specification

Column 1, Line 9, "2012," should be -- 2012, now abandoned, --.

Column 10, Line 43, "work station" should be -- workstation --.

Column 11, Line 60, "work stations" should be -- workstations --.

Column 20, Line 37, "explain" should be -- explained --.

Column 22, Line 31, "changed" should be -- changes --.

Column 23, Line 45, "N08" should be -- N08. --.

Column 25, Line 7, "List B)." should be -- List B. --.

Signed and Sealed this
Twenty-seventh Day of January, 2026

John A. Squires
*Director of the United States Patent and Trademark Office*